United States Patent
Hatano et al.

[11] Patent Number: 6,084,647
[45] Date of Patent: Jul. 4, 2000

[54] LIQUID CRYSTAL DISPLAY DEVICE

[75] Inventors: Akitsugu Hatano; Hiroshi Hamada, both of Nara, Japan

[73] Assignee: Sharp Kabushiki Kaisha, Osaka, Japan

[21] Appl. No.: 08/972,017

[22] Filed: Nov. 17, 1997

[30] Foreign Application Priority Data

Nov. 22, 1996 [JP] Japan .................................. 8-312483
Nov. 22, 1996 [JP] Japan .................................. 8-312484

[51] Int. Cl.$^7$ .......................... G02F 1/136; G02F 1/1335
[52] U.S. Cl. ............................. 349/15; 349/42; 349/96; 349/97; 349/117
[58] Field of Search ........................... 349/42, 43, 96, 349/98, 117, 128, 129, 122; 359/464, 465

[56] References Cited

U.S. PATENT DOCUMENTS

| | | | |
|---|---|---|---|
| 5,602,661 | 2/1997 | Schadt et al. | 349/117 |
| 5,784,139 | 7/1998 | Chigrinov et al. | 349/117 |
| 5,805,250 | 9/1998 | Hatano et al. | 349/15 |

FOREIGN PATENT DOCUMENTS

| | | | |
|---|---|---|---|
| 4-15619 | 1/1992 | Japan | 349/114 |
| 6-34969 | 2/1994 | Japan | 349/114 |

*Primary Examiner*—William L. Sikes
*Assistant Examiner*—Tai V. Duong
*Attorney, Agent, or Firm*—Nixon & Vanderhye P.C.

[57] ABSTRACT

The liquid crystal display device of this invention includes: a plurality of pixels including right-eye pixels and left-eye pixels; a display screen constructed of the plurality of pixels; a first substrate including a first display electrode; a second substrate including a second display electrode arranged to oppose the first display electrode; a polarizing layer disposed in at least one of the first substrate and the second substrate; and a reflection film disposed in one of the first substrate and the second substrate, wherein the polarizing layer has first regions arranged to correspond to the right-eye pixels and second regions arranged to correspond to the left-eye pixels, the first regions selectively transmitting first polarized light while the second regions selectively transmitting second polarized light which is different from the first polarized light.

9 Claims, 9 Drawing Sheets

Reflected light blocked

Reflected light transmitted

LIQUID CRYSTAL DISPLAY DEVICE

BACKGROUND OF THE INVENTION

1. Field of the Invention

The present invention relates to a liquid crystal display device capable of displaying stereoscopic three-dimensional images which is used for TV sets, game machines, personal computers, CAD apparatus, medical monitors, portable information terminals, and the like.

2. Description of the Related Art

It has been long attempted to reproduce stereoscopic images or three-dimensional images. A variety of methods have been proposed to realize this goal, including a method using a laser hologram and the like. Among these methods, two types of three-dimensional image display methods with higher perfection which can display full-color moving pictures of three principal colors have been proposed. These two types are based on the same principle: That is, different images for the right and left eyes of an observer are separately displayed, to generate the parallax between the two eyes by the image deviation between the two eyes, and thus to provide the observer with the sense of depth in the images.

The first one of the two methods is a polarizing glasses method. In this method, images for the right and left eyes include two types of linearly polarized light in which polarizing directions are inclined at an angle of 90° from each other. The observer perceives three-dimensional images by wearing a pair of polarizing glasses. In the case of projection display, images for right and left eyes are superimposed with each other on a screen using two polarizing projectors. In the case of direct-view display, images output from two display devices are synthesized by a half mirror or a polarizing mirror.

The second one of the two methods is a shutter glasses method. In this method, images for right and left eyes are displayed by a single display device using time division. The observer wears a pair of glasses having a shutter function which alternately opens and closes in synchronization with the displayed images so as to provide three-dimensional images. This method is applicable to both the projection display and the direct-view display.

In the above two methods, images for right and left eyes are both presented as two-dimensional images. These two-dimensional images may be displayed by a liquid crystal display (LCD), cathode ray tube (CRT), a plasma display, or the like depending on the use of the images.

The polarizing glasses method requires two display devices and a projection device since two images having different polarizing axes must be simultaneously displayed at any time. This increases the cost and the size of the entire apparatus, and thus is not suitable for domestic use.

In order to overcome the above problem of the polarizing glasses method, Japanese Laid-Open Publication No. 58-184929, for example, proposes a method for displaying three-dimensional images by use of a single display device. According to this method, a mosaic polarizing layer composed of a plurality of portions corresponding to pixels arranged in a mosaic shape where the polarizing axes of adjacent portions are perpendicular to each other is closely attached to the outer surface of the display device (CRT or LCD). The observer can perceive three-dimensional images by observing two-dimensional images for the right and left eyes presented by the display device via a pair of polarizing glasses. The above publication, however, discloses no practical description on the position of the mosaic polarizing layer in the display device when the display device is an LCD. Hereinbelow, therefore, the method disclosed in the above publication will be described assuming that the polarizing layer is disposed on the outer surface of a liquid crystal display device.

FIG. 13 is a conceptual view of a liquid crystal display device having a three-dimensional display function proposed in Japanese Laid-Open Publication No. 58-184929 mentioned above.

A display device body 701 includes right-eye pixels 706 and left-eye pixels 707 for displaying images for the right and left eyes, respectively. The right-eye and left-eye pixels 706 and 707 constitute a display screen. Two types of polarizing layers 703 and 704 of which polarizing axes are perpendicular to each other are disposed alternately on the front side of the display screen. More specifically, the polarizing layers 703 and 704 are disposed so as to correspond to the right-eye pixels 706 and the left-eye pixels 707, respectively, to distinguish images for the right eye and the left eye from each other. The observer wears a pair of polarizing glasses 712 which include a right-eye polarizing plate 712b of which polarizing axis is identical to that of the polarizing layers 703 disposed in front of the right-eye pixels 706 and a left-eye polarizing plate 712a of which polarizing axis is identical to that of the polarizing layers 704 disposed in front of the left-eye pixels 707. By wearing the pair of glasses 712, the right and left eyes of the observer observe only images for the right and left eyes, respectively, and thus perceives stereoscopic three-dimensional images.

The display device body 701 includes a pair of glass substrates 702a and 702b disposed to sandwich a liquid crystal layer 705 therebetween. The right-eye pixels 706 and the left-eye pixels 707 are formed on the surface of one of the glass substrates, i.e., the glass substrate 702a (located left as is viewed in FIG. 13), facing the liquid crystal layer 705. An alignment film 710a is formed on the right-eye and left-eye pixels 706 and 707. A polarizing plate 708 is disposed on the surface of the glass substrate 702a opposite to the surface thereof facing the liquid crystal layer 705. A transparent electrode 709 and an alignment film 710b are formed in this order on the surface of the other glass substrate, i.e., the glass substrate 702b, facing the liquid crystal layer 705. The liquid crystal layer 705 is sealed with a sealing member 711 formed to surround the liquid crystal layer 705.

The conventional display device with the above configuration has the following problem.

Referring to FIG. 14, in the display device body 701, the glass substrate 702b exists between the right-eye and left-eye pixels 706 and 707 and the right-eye and left-eye polarizing layers 703 and 704. When the observer observes the display screen from the front position as is shown by the dash-dot lines in FIG. 14, the observer can perceive normal three-dimensional images. However, as the eyes of the observer move upward or downward from the front position, the right-eye pixels 706 may be observed via the polarizing layers 704 for the left eye and, reversely, the left-eye pixels 707 may be observed via the polarizing layers 703 for the right eye, as is shown by the dotted lines in FIG. 14. In such a case, a phenomenon called crosstalk may be generated in which some images for right and left eyes are observed by the reverse eyes, and thus actual three-dimensional images may not be obtained. In FIG. 14, some components of the display device body 701 shown in FIG. 13 are omitted for simplification.

In order to eliminate such crosstalk, Japanese Laid-Open Publication No. 62-135810 proposes a display device including a single transparent liquid crystal display element. In this proposed display device, polarizing layers in which the polarizing directions are different from each other are disposed inside a pair of glass substrates of the transparent liquid crystal display element. With this configuration, right-eye pixels and left-eye pixels of the transparent liquid crystal display element are adjacent to the polarizing layers for the right eye and the polarizing layers for the left eye, respectively. This prevents the generation of crosstalk as described above even when the eyes of the observer move upward or downward from the front position of the display screen. As a result, the range within which three-dimensional images can be perceived is not limited, and thus a display device capable of displaying three-dimensional images with a wide viewing angle can be obtained.

A transmission liquid crystal display element is conventionally used for such a liquid crystal display device which has the three-dimensional display function and employs the polarizing glasses method. This type of device requires a light source for illuminating the liquid crystal display element, i.e., a backlight, increasing power consumption. In the applications using a battery, such as portable information terminals, this light source requirement shortens the time duration available from one charging of a battery. Providing a light source also increases the production cost of the display device.

In view of the foregoing, the objective of the present invention is to provide a thin and light-weight liquid crystal display device with the three-dimensional display function which has a prolonged time duration with reduced power consumption, can be manufactured at low cost, and eliminates the generation of crosstalk at the display of three-dimensional images to realize good image display with a wide viewing angle and thus to expand the applicable field of view of the device.

SUMMARY OF THE INVENTION

The liquid crystal display device of this invention includes: a plurality of pixels including right-eye pixels and left-eye pixels; a display screen constructed of the plurality of pixels; a first substrate including a first display electrode; a second substrate including a second display electrode arranged to oppose the first display electrode; a polarizing layer disposed in at least one of the first substrate and the second substrate; and a reflection film disposed in one of the first substrate and the second substrate, wherein the polarizing layer has first regions arranged to correspond to the right-eye pixels and second regions arranged to correspond to the left-eye pixels, the first regions selectively transmitting first polarized light while the second regions selectively transmitting second polarized light which is different from the first polarized light.

In one embodiment of the invention, the polarizing layer is disposed in the second substrate, and the first display electrode is a reflective display electrode which also serves as a reflection film.

In another embodiment of the invention, the first polarized light and the second polarized light are linearly polarized light of which polarizing directions are perpendicular to each other.

In still another embodiment of the invention, the first polarized light and the second polarized light are circularly polarized light of which polarizing directions are rotated in opposite directions to each other.

In still another embodiment of the invention, the liquid crystal display further includes an optical rotation layer or a phase layer disposed to correspond to at least either of the right-eye pixels and the left-eye pixels.

In still another embodiment of the invention, the first substrate further includes switching elements connected to the first display electrode and signal lines connected to the switching elements.

In still another embodiment of the invention, the first substrate further includes switching elements connected to the first display electrode, signal lines connected to the switching elements, and an interlayer insulating film formed over the switching elements and the signal lines, and the first display electrode is formed on the interlayer insulating film to cover the switching elements.

In still another embodiment of the invention, the liquid crystal display device further includes a liquid crystal layer interposed between the first substrate and the second substrate, and one of an electric field control birefringence mode, a guest-host mode, and a twisted nematic mode is employed as a display mode.

In still another embodiment of the invention, the liquid crystal display device further includes a liquid crystal layer interposed between the first substrate and the second substrate and alignment films disposed in the first substrate and the second substrate, wherein the alignment films are alignment-treated so that liquid crystal molecules in regions of the liquid crystal layer corresponding to the right-eye pixels and liquid crystal molecules in regions of the liquid crystal layer corresponding to the left-eye pixels are oriented in directions perpendicular to each other.

In still another embodiment of the invention, the first substrate includes a first insulating plate and the second substrate includes a second insulating plate, and the polarizing layer is located between the first insulating plate and the second insulating plate.

Alternatively, the liquid crystal display device according to the present invention includes: a plurality of pixels including right-eye pixels and left-eye pixels; a display screen constructed of the plurality of pixels; a main substrate; and a counter substrate, wherein the main substrate includes switching elements, signal lines, an interlayer insulating film formed over the switching elements and the signal lines, and pixel electrodes formed on the interlayer insulating film, the counter substrate includes a light reflection layer, and a counter electrode disposed so as to oppose the pixel electrodes, and the interlayer insulating film has first regions arranged to correspond to the right-eye pixels and second regions arranged to correspond to the left-eye pixels, the first regions selectively transmitting first polarized light while the second regions selectively transmitting second polarized light which is different from the first polarized light.

In one embodiment of the invention, the interlayer insulating film includes a polarizing layer and a phase layer, the polarizing layer selectively transmits the first polarized light in the first regions and the second polarized light in the second regions, and the phase layer has a phase difference function only in the first regions.

In another embodiment of the invention, the liquid crystal display device further includes a liquid crystal layer interposed between the main substrate and the counter substrate, wherein the first polarized light which has passed through the polarizing layer is provided with a phase difference by the phase layer to become the second polarized light, and thus the second polarized light is incident on the liquid crystal layer over the entire display screen.

In still another embodiment of the invention, the liquid crystal display device further includes a liquid crystal layer interposed between the main substrate and the counter substrate, wherein the liquid crystal layer includes first liquid crystal regions corresponding to the right-eye pixels and second liquid crystal regions corresponding To the left-eye pixels, and liquid crystal molecules in the first liquid crystal regions are oriented to selectively optically modulate the first polarized light, while liquid crystal molecules in the second liquid crystal regions are oriented to selectively optically modulate the second polarized light.

In still another embodiment of the invention, the plurality of pixels include a plurality of pixel groups, each of the plurality of pixel groups being composed of at least one pixel for displaying a same image, and the plurality of pixel groups are arranged so that right-eye pixel groups and left-eye pixel groups are adjacent to each other.

In still another embodiment of the invention, the plurality of pixels are arranged in a matrix, and each of the plurality of pixel groups is composed of one row of pixels aligned in a horizontal direction or one column of pixels aligned in a vertical direction.

Alternatively, the liquid crystal display device according to the present invention includes: a plurality of pixels including right-eye pixels and left-eye pixels; a display screen constructed of the plurality of pixels; a main substrate; a counter substrate; and a liquid crystal layer interposed between the main substrate and the counter substrate, wherein the main substrate includes switching elements, signal lines, an interlayer insulating film formed over the switching elements and the signal lines, and pixel electrodes formed on the interlayer insulating film, the counter substrate includes a light reflection layer, and a counter electrode disposed so as to oppose the pixel electrodes, the interlayer insulating film has first regions arranged to correspond to the right-eye pixels and second regions arranged to correspond to the left-eye pixels, the first regions selectively transmitting first polarized light while the second regions selectively transmitting second polarized light which is different from the first polarized light, and the liquid crystal layer modulates a transmission amount of at least one of the first polarized light and the second polarized light incident on the liquid crystal layer from the interlayer insulating film.

In one embodiment of the invention, the plurality of pixels include a plurality of pixel groups, each of the plurality of pixel groups being composed of at least one pixel for displaying a same image, and the plurality of pixel groups are arranged so that right-eye pixel groups and left-eye pixel groups are adjacent to each other.

In another embodiment of the invention, the plurality of pixels are arranged in a matrix, and each of the plurality of pixel groups is composed of one row of pixels aligned in a horizontal direction or one column of pixels aligned in a vertical direction.

In still another embodiment of the invention, the liquid crystal display device further includes a liquid crystal layer interposed between the main substrate and the counter substrate, wherein the interlayer insulating film includes a phase layer and a polarizing layer, the polarizing layer being disposed closer to the liquid crystal layer than the phase layer, the first polarized light and the second polarized light are linearly polarized light, and the phase layer converts the first linearly polarized light received from the polarizing layer into first circularly polarized light in the first region, and converts the second linearly polarized light received from the polarizing layer into second circularly polarized light in the second region.

It has been conventionally impossible to form a polarizing layer in the inner portion of one of a pair of substrates constituting a liquid crystal display device which includes switching elements such as TFTs and the like (called an active matrix substrate) because no polarization selectable material durable for the process temperature at the fabrication of the TFTs is available. According to the present invention, the formation of a polarizing layer in the inner portion of the active matrix substrate is realized by providing an interlayer insulating film formed in the inner surface portion of the active matrix substrate with the polarization selection function. This solves the conventional problems that the polarizing layer loses the polarization selection function and that crosstalk is generated at the display of three-dimensional images. As a result, images with a wide viewing angle can be obtained, and the display quality improves.

Since the interlayer insulating film is provided with the polarization selection function, it is not necessary to form a separate polarizing layer in the inner portion of the active matrix substrate. This aspect of the invention shortens the fabrication process.

According to the present invention, three-dimensional images are displayed by a liquid crystal display device of a reflective type. A light source for illumination is therefore unnecessary unlike the case of a liquid crystal display device of a transmission type. The reflective liquid crystal display device according to the present invention is therefore thin and light in weight, and reduces power consumption. Accordingly, the applicable field of such a display device capable of displaying three-dimensional images expands.

Thus, the invention described herein makes possible the advantage of providing a thin and light-weight liquid crystal display device with a three-dimensional display function which has a prolonged time duration with reduced power consumption, can be manufactured at low cost, and eliminates the generation of crosstalk in three-dimensional image display to realize a good image display with a wide viewing angle and thus to expand the applicable field of the device.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

EXAMPLE 1

In Example 1, a light reflection layer is disposed in the outer surface portion of one of a pair of substrates constituting a part of a liquid crystal display device, i.e., a counter substrate, and polarizing layers and a phase layer are disposed in the inner surface portion of the other substrate, i.e., an active matrix substrate, so as to form a reflective liquid crystal display device. Two types of light having different polarizing states corresponding to right-eye and left-eye pixels are output from the side of the active matrix substrate. In this example, pixels of the liquid crystal display device are divided into a plurality of groups each including at least one pixel. Pixels in the same group are used to display the same image.

Figure 1:
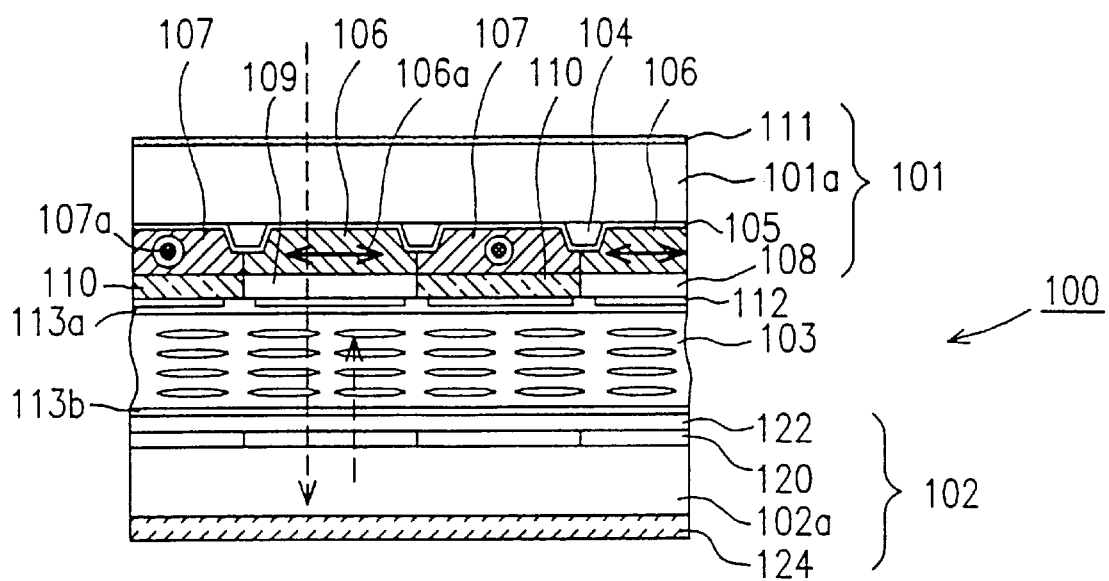
FIG. 1 is a sectional view of a reflective liquid crystal display device of Example 1 according to the present invention.

FIG. 1 is a sectional view schematically showing a reflective liquid crystal display device 100 of Example 1 according to the present invention.

The reflective liquid crystal display device 100 includes an active matrix substrate 101, a counter substrate 102, and a liquid crystal layer 103 interposed between the substrates 101 and 102. The active matrix substrate 101 includes a transparent insulating substrate 101a. Gate signal lines 104 and then a gate insulating film 105 are formed on the inner surface of the transparent insulating substrate 101a facing the liquid crystal layer 103 as shown in FIG. 1. Thin film transistors (TFTs) as switching elements, signal lines, and the like are formed on the gate insulating film 105 though they are not shown. Polarizing layers 106 and 107 and a phase plate 108 which also serve as an interlayer insulating film are disposed on the resultant substrate.

The polarizing layers 106 and 107 have polarizing axes 106a and 107a, respectively, which are perpendicular to each other, and are disposed so that one of each pair of the polarizing layers 106 and 107 corresponds to a right-eye pixel group while the other one corresponds to a left-eye pixel group. In this example, each pixel group is composed of one row of pixels aligned in the horizontal direction (i.e., pixels sharing a same gate signal line), and such rows of pixel groups are alternately allocated for the right eye and the left eye every row. Therefore, the polarizing layers 106 and 107 are also alternately disposed in every row of pixels.

The phase layer 108 is composed of regions 109 which do not provide a phase difference to incident light and regions 110 which provide a phase difference to incident light. The regions 109 and 110 are arranged to correspond to the polarizing layers 106 and 107, respectively, as shown in FIG. 1. Thus, the regions 109 and 110 are also alternately arranged every row of pixels. The regions 110 having the phase difference providing function have an optical axis shifted by 45° with respect to the polarizing axis 107a of the corresponding polarizing layers 107, thereby to provide a phase difference of a half wavelength.

A plurality of transparent electrodes 112 and an alignment film 113a for regulating the orientation of liquid crystal molecules in the liquid crystal layer 103 are disposed in this order on the phase layer 108.

The counter substrate 102 includes a transparent insulating substrate 102a. Color filters 120, a counter electrode 122, and an alignment film 113b are formed in this order on the transparent insulating substrate 102a. The color filters 120 may be made of red (R), green (G), and blue (B) pixels, or made of cyan (C), magenta (M), and yellow (Y) pixels, in consideration of the image display by the reflective display device and depending on the field where the display device is applied.

A light reflection layer 124 made of a metal such as Al or Ag is formed on the outer surface of the transparent insulating substrate 102a of the counter substrate 102. A reflection blocking layer 111 is formed on the outer surface of the transparent insulating substrate 110a of the active matrix substrate 101 for preventing ambient light from reflecting from the insulating substrate 101a. Thus, in the reflective liquid crystal display device 100 of this example, light is incident on the side of active matrix substrate 101, reflected by the light reflection layer 124 in the outer surface of the counter substrate 102 after passing through the liquid crystal layer 103, and output from the active matrix substrate 101 after passing again through the liquid crystal layer 103.

The liquid crystal layer 103 is made of a guest-host mode liquid crystal material. In this example, a mixture of a p-type black pigment as a dichromatic pigment and a nematic liquid crystal material having a positive dielectric anisotropy is used. The liquid crystal molecules and the dichromatic pigment molecules are aligned so that the optical absorption axis of the dichromatic pigment molecules obtained when the liquid crystal molecules and the dichromatic pigment molecules are aligned is parallel to the polarizing direction of light which has passed through the polarizing layers and the phase layer. With this alignment, polarized light incident on the liquid crystal layer 103 is absorbed by the dichromatic pigment molecules when the TFTs (not shown) are in the OFF state, i.e., when no electric field is applied to the liquid crystal layer 103, resulting in a black display. When the TFTs are in the ON state, i.e., when an electric field is applied to the liquid crystal layer 103, the orientation directions of the liquid crystal molecules and the dichromatic pigment molecules change. Polarized light incident on the liquid crystal layer 103 therefore passes through the liquid crystal layer 103 without being absorbed by the dichromatic pigment molecules.

Figure 2:
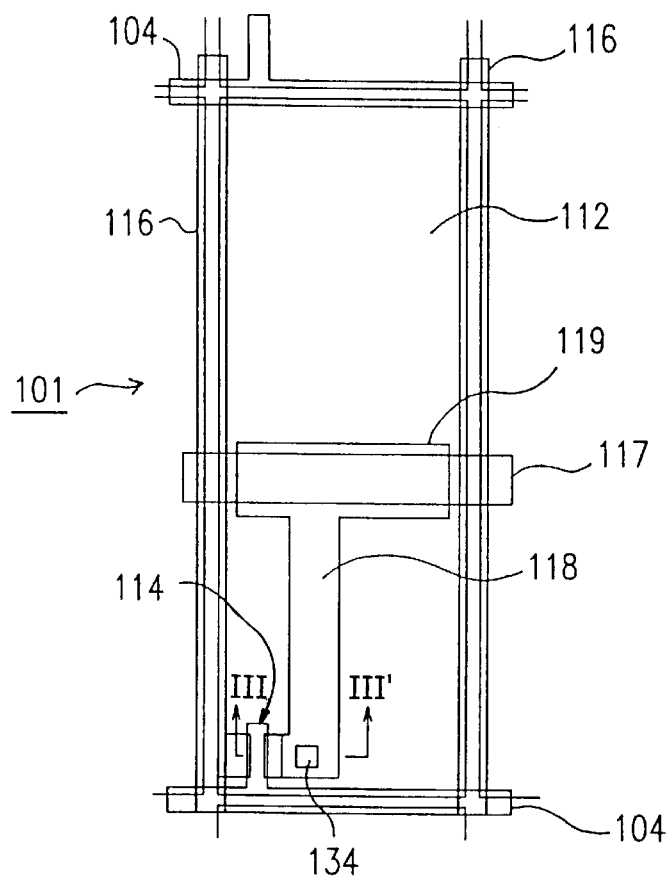
FIG. 2 is a plan view of one pixel of an active matrix substrate of the reflective liquid crystal display device of FIG. 1.
Figure 3:
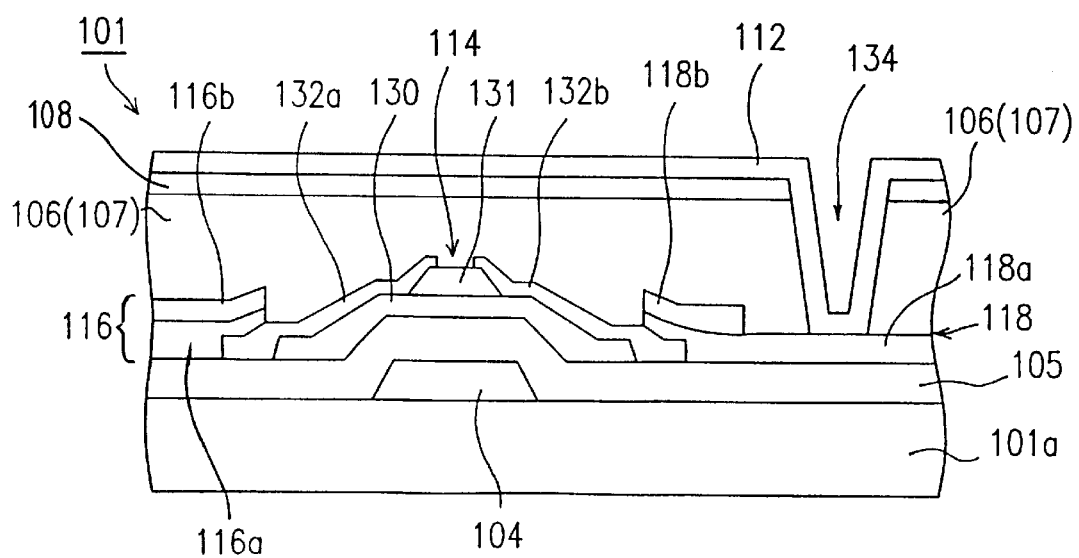
FIG. 3 is a sectional view of the active matrix substrate, taken along line A–A' of FIG. 2.

Next, an exemplified method for fabricating the active matrix substrate 101 in this example will be described with reference to FIGS. 1 to 3. FIG. 2 is a plan view of the active matrix substrate 101, and FIG. 3 is a sectional view taken along line III—III of FIG. 2. FIGS. 2 and 3 show only a portion corresponding to one pixel of the active matrix substrate for simplification.

A metal such as Ta or Al is deposited on the transparent insulating substrate 101a by sputtering and patterned to form the gate signal lines 104. The gate signal lines 104 include branches used as gate electrodes of TFTs 114 of respective pixels. Electrodes 117 of storage capacitors to be disposed in parallel with the gate signal lines 104 may also be formed together with the gate signal lines 104. The gate insulating film 105 is then formed over the entire surface of the transparent insulating substrate 101a covering the gate signal lines 104. SiN or $SiO_2$ may be used for the gate insulating film 105.

Semiconductor layers 130 are then formed on the gate insulating film 105 and patterned into a predetermined shape. Channel protection layers 131 made of SiN, for example, are formed on the portions of the semiconductor layers 130 located above the gate electrodes. Thereafter, an $n^+Si$ layer is formed on the resultant substrate and patterned to form source electrodes 132a and drain electrodes 132b which cover both side portions of the channel protection layers 131 and part of the semiconductor layers 130. Each pair of the source electrode 132a and the drain electrode 132b are therefore separated from each other at the top of the corresponding channel protection layer 131.

Source signal lines 116 are then formed. In this example, as shown in FIG. 3, each source signal line 116 has a double-layer structure composed of a lower line 116a made of a transparent conductive material such as ITO and an upper line 116b made of a metal material such as Ta or Al. The source signal lines 116 are in contact with side portions of the source electrodes 132a. Simultaneously with the formation of the source signal lines 116, transparent conductive films 118a and metal films 118b are formed so that they are in contact with side portions of the drain electrodes 132b. Each transparent conductive film 118a extends to connect the drain electrode 132b with the corresponding pixel electrode 112 and also serves as an electrode 119 of the storage capacitor.

The polarizing layers 106 and 107 and the phase layers 108 are formed on the transparent insulating substrate 101a with the above layers formed thereon. The polarizing layers 106 and 107 of which polarizing axes are different from each other are formed by the same process. That is, a mixture of a photo-oriented organic material and a dichromatic pigment dye or iodide is applied to the resultant surface of the transparent insulating substrate 101a to a predetermined thickness. The applied material is then irradiated with ultraviolet (UV) light including linearly polarized light via a mask disposed on the applied material. The mask has open portions each corresponding to one row of pixels and light-shading portions each corresponding to one row of pixels and these portions are alternately arranged. The UV light passes through the open portions of the mask to form the polarizing layers of which polarizing axis is along the polarizing axis of the irradiated UV light. Then, the mask is rearranged so that the open portions are located above the portions of the applied material which have not been irradiated with the UV light, and these are irradiated with UV light including linearly polarized light of which polarizing axis is different from that of the previously-used UV light. In this way, polarizing layers of which polarizing axis is different from that of the previously-formed polarizing layers are formed. A polymer material which exhibits photoisomerization reaction (e.g., a polymer including azobenzene as a side chain) as disclosed in Japanese Laid-Open Publication No. 7-261024 and a dichromatic pigment may be used for the polarizing layers.

The phase layer 108 is formed in substantially the same procedure as the polarizing layers 106 and 107. That is, a photopolymerizable liquid crystal material, for example, is applied to the transparent insulating substrate 101a with the polarizing layers 106 and 107 formed thereon. The applied material is irradiated with UV light including linearly polarized light via a mask with a pattern as described above. As a result, regions of the applied material irradiated with the UV light constitute the regions 110 which have an optical axis along the polarizing axis of the irradiated linearly polarized light and provide a half-wavelength phase difference. A UV-curable liquid crystal material exhibiting the nematic phase at room temperature as disclosed in Japanese Laid-Open Publication No. 8-29618 may be used for the phase layer.

The thus-formed polarizing layers 106 and 107 and the phase layers 108 also serve as the interlayer insulating film. Contact holes 134 are formed through the polarizing layers 106 and 107 and the phase layer 108 to reach respective connection electrodes 118 by photolithography, for example, as shown in FIG. 3.

The pixel electrodes 112 made of transparent conductive films are then formed on the phase layer 108. Since the polarizing layers 106 and 107 and the phase layer 108 serve as the interlayer insulating film, the electrodes 112 can be formed to overlap the gate signal lines 104, the source signal lines 116, and the TFTs 114. Each pixel electrode 112 is connected with the connection electrode 118 which is in turn connected with the drain electrode 132b of the TFT 114 via the contact hole 134.

Finally, the alignment film 113a is formed to cover the pixel electrodes 112, and the reflection blocking layer 111 composed of a single-layer or multi-layer film of a dielectric such as $MgF_2$ is formed on the surface of the transparent insulating substrate 101a opposite to the surface thereof where the pixel electrodes 112 and the like are formed. Thus, the active matrix substrate 101 is completed. The thus-obtained active matrix substrate 101 is attached together with the counter substrate 102 so that the alignment films 113a and 113b face each other. A guest-host mode liquid crystal material is injected in the space formed between the substrates 101 and 102 to form the liquid crystal layer 103.

According to the reflective liquid crystal display device 100 of Example 1, ambient light is incident on the active matrix substrate 101, and converted into two types of linearly polarized light of which polarizing axes are perpendicular to each other by passing through the polarizing layers 106 and 107 formed alternately every row of pixels. Then, the polarizing axes of the two types of light become the same after passing through the phase layer 108. The thus-transformed light then reaches the liquid crystal layer 103 under the above state. Thus, the light transmittance amount can be adjusted for the entire screen by controlling the orientation directions of the liquid crystal molecules and the dichromatic pigment molecules in the liquid crystal layer 103. More specifically, when the TFTs 114 (see FIGS. 2 and 3) are in the OFF state, light is absorbed and thus a black display is obtained. On the contrary, when the TFTs 114 are in the ON state, light passes through the liquid crystal layer 103 and the counter electrode 122 and the color filters 120 of the counter substrate 102 in this order to reach the light reflection layer 124.

The light is then reflected by the light reflection layer 124 and incident again on the phase layer 108 via the reverse optical path while the polarizing direction is kept unchanged. Part of the light which is incident on the regions 110 of the phase layer 108 having the phase difference providing function is provided with a half-wavelength phase difference, to become light in which the polarizing direction is rotated by 90°. As a result, two types of linearly polarized light in which the polarization axes are perpendicular to each other are output from the phase layer 108 alternately every row of pixels. The polarizing layers 106 and 107 thus receive light in which the polarization axes are identical to their own polarization axes. Thus, the active matrix substrate 101 outputs light corresponding to right-eye images and light corresponding to left-eye images as two types of light in which the polarizing axes are perpendicular to each other.

As described above, the reflective liquid crystal display device 100 of Example 1 outputs light for right-eye images and light for left-eye images alternately every row of pixels. The observer can perceive three-dimensional images output from the output side of the active matrix substrate 101 by wearing a pair of polarizing glasses (not shown) which includes polarizing plates having the polarizing axes corresponding to the polarizing axes of the polarizing layers 106 and 107. When the observer does not wear the pair of polarizing glasses, he or she observes two-dimensional images.

The liquid crystal display device 100 of Example 1 which is of a reflective type using ambient light requires no light source for illumination (backlight). Therefore, a three-dimensional image display device with reduced power consumption is realized, allowing the three-dimensional image display device to be used for a wider range of applications including apparatus driven with a battery.

Moreover, in the reflective liquid crystal display device 100 of Example 1, the interlayer insulating film formed in the inner portion of the active matrix substrate 101 for insulating the signal lines, the TFTs, and the like from the pixel electrodes is provided with at least one of the polarization selection function and the phase difference providing function. This reduces the number of steps and the number of components in the entire fabrication process of the liquid crystal display device.

EXAMPLE 2

In Example 2, a light reflection layer is disposed on the inner surface of the transparent insulating substrate of the counter substrate, and polarizing layers are disposed on the inner surface of the transparent insulating substrate of the active matrix substrate. A reflective liquid crystal display device 200 of Example 2 will be described with reference to FIGS. 4 and 5, where the same components as those shown in FIGS. 1 to 3 are denoted by the same reference numerals, and the description thereof is omitted here.

Figure 4:
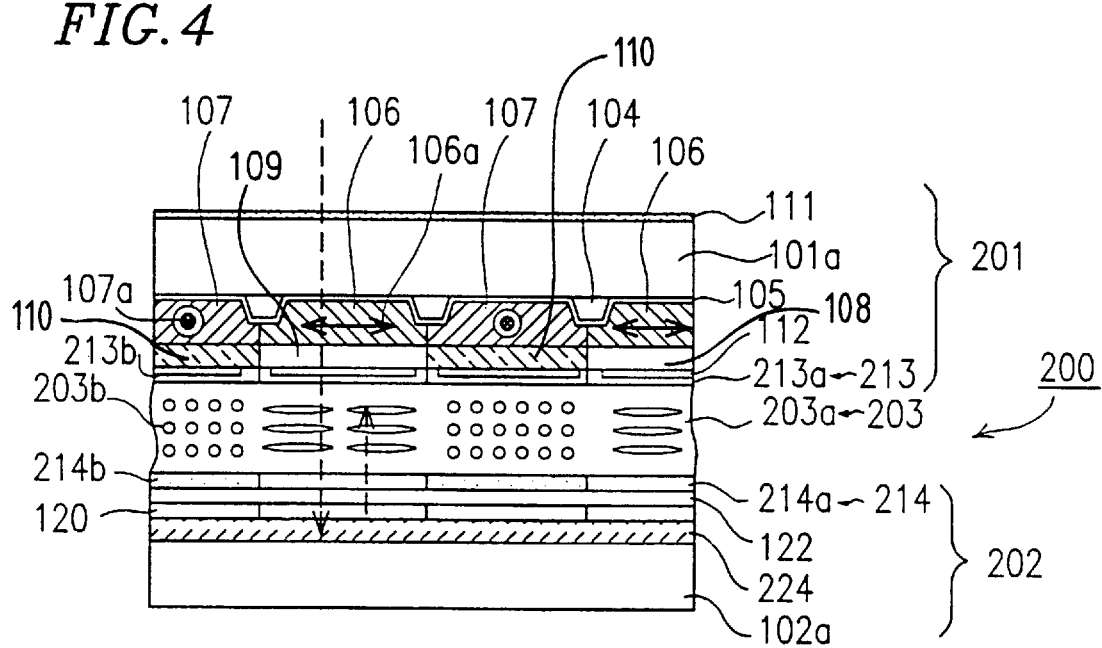
FIG. 4 is a sectional view of a reflective liquid crystal display device of Example 2 according to the present invention.

FIG. 4 is a sectional view schematically showing the reflective liquid crystal display device 200 of Example 2 according to the present invention.

The reflective liquid crystal display device 200 includes an active matrix substrate 201, a counter substrate 202, and a liquid crystal layer 203 interposed between the substrates 201 and 202. The active matrix substrate 201 includes a transparent insulating substrate 101a. Gate signal lines 104 and then a gate insulating film 105 are formed on the inner surface of the transparent insulating substrate 101a facing the liquid crystal layer 203 as shown in FIG. 4. TFTs as switching elements, signal lines, and the like are formed on the gate insulating film 105 though they are not shown. Polarizing layers 106 and 107 and a phase plate 108 which also serve as an interlayer insulating film are disposed on the resultant substrate.

The polarizing layers 106 and 107 have polarizing axes 106a and 107a, respectively, which are perpendicular to each other, and are disposed so that one of each pair of the polarizing layers 106 or 107 corresponds to a right-eye pixel group while the other one corresponds to a left-eye pixel group. In this example, each pixel group is composed of one row of pixels aligned in the horizontal direction (i.e., pixels sharing a same gate signal line). The polarizing layers 106 and 107 are therefore alternately disposed in every row of pixels. The phase layer 108 is composed of regions 109 which do not provide a phase difference to incident light and regions 110 which provide a phase difference to incident light. The regions 109 and 110 are arranged to correspond to the polarizing layers 106 and 107, respectively, as shown in FIG. 4. A plurality of transparent electrodes 112 as pixel electrodes are formed on the phase layer 108. The polarizing layers 106 and 107 are formed in the manner described in Example 1.

An alignment film 213 is formed over the pixel electrodes 112. The alignment film 213 is composed of regions 213a and 213b which are alternately arranged in every row of pixels as shown in FIG. 4. The regions 213a and 213b of the alignment film 213 have been alignment-treated so that the orientation direction of liquid crystal molecules in contact with the regions 213a is different by 90° from that of liquid crystal molecules in contact with the regions 213b. A reflection blocking film 111 is formed on the outer surface of the transparent insulating substrate 101a of the active matrix substrate 201 as in Example 1.

The counter substrate 202 includes a transparent insulating substrate 102a. A light reflection layer 224, color filters 120, and a counter electrode 122 are formed in this order on the transparent insulating substrate 102a. The light reflection layer 224 is made of a metal such as Al or Ag, for example. The color filters 120 may be made of red (R), green (G), and blue (B) pixels, or made of cyan (C), magenta (M), and yellow (Y) pixels, in consideration of the image display by the reflective display device and depending on the field where the display device is applied.

An alignment film 214 having regions 214a and 214b which have been differently alignment-treated is formed on the counter electrode 122. The regions 214a and 214b of the alignment film 214 have been alignment-treated so that the orientation direction of liquid crystal molecules in contact with the regions 214a is different by 90° from that of liquid crystal molecules in contact with the regions 214b. The regions 214a and 214b are arranged alternately every row of pixel so as to face the regions 213a and 213b of the alignment film 213, respectively.

The liquid crystal layer 203 is made of a guest-host mode liquid crystal material. In this example, a mixture of a p-type black pigment as a dichromatic pigment and a nematic liquid crystal material having a positive dielectric anisotropy is used as in Example 1. The orientation direction of liquid crystal molecules 203a in the portions of the liquid crystal layer 203 interposed between the regions 213a of the alignment film 213 and the regions 214a of the alignment film 214 is regulated by the regions 213a and 214a. Likewise, the orientation direction of liquid crystal molecules 203b in the portions of the liquid crystal layer 203 interposed between the regions 213b of the alignment film 213 and the regions 214b of the alignment film 214 is regulated by the regions 213b and 214b. Therefore, the orientation direction of the liquid crystal molecules 203a is perpendicular to that of the liquid crystal molecules 203b, and thus the two types of regions of the liquid crystal layer 203 having the orientation directions perpendicular to each other are formed alternately in every row of pixels over the entire display screen. As a result, the polarizing axis of light which has been incident on the active matrix substrate 201 and has passed through the polarizing layers 106 and 107 when no electric field is applied to the liquid crystal layer 203 is parallel to the optical absorption axis of dichromatic pigment molecules over the entire display screen. Black display is therefore obtained when TFTs (not shown) are in the OFF state. When the TFTs are in the ON state, light which has reached the liquid crystal layer 203 via the polarizing layers 106 and 107 is not absorbed by the dichromatic pigment molecules. The light is thus allowed to pass through the liquid crystal layer 203.

A photo-orientation method was used as an alignment treatment method for the alignment films 213 and 214. That is, an alignment material such as a photosensitive resin, e.g., polyvinyl cinnamate, is applied to the transparent insulating substrate 101a of the active matrix substrate 201 and the transparent insulating substrate 102a of the counter substrate 202 to a predetermined thickness. The applied material is then irradiated with ultraviolet (UV) light including linearly polarized light in vertical and inclined directions via a mask disposed on the applied material. The mask has open portions each corresponding to one row of pixels and light-shading portions each corresponding to one row of pixels alternately arranged. Thus, the regions 213a, 213b, 214a, and 214b having alignment directions along the polarizing axes of the irradiated light are formed.

In the reflective liquid crystal display device 200 with the above configuration, ambient light is incident on the active matrix substrate 201, and converted into two types of linearly polarized light of which polarizing axes are perpendicular to each other by passing through the polarizing layers 106 and 107 formed alternately every row of pixels. The two types of light then pass through the alignment film 213 to reach the liquid crystal layer 203. The orientation directions of the liquid crystal molecules in the liquid crystal layer 203 are different by 90° every row of pixels in correspondence with the polarizing axes of the polarizing layers 106 and 107. Accordingly, the amount of light passing through the liquid crystal layer 203 can be adjusted for the entire screen by controlling the orientation directions of the liquid crystal molecules and the dichromatic pigment molecules. More specifically, when the TFTs are in the OFF state, light is absorbed and thus black display is obtained. On the contrary, when the TFTs are in the ON state, light passes through the liquid crystal layer 203, the alignment film 214, the counter electrode 122, and the color filters 120 in this order to reach the light reflection layer 224.

The light is then reflected by the light reflection layer 224 and incident again on the polarizing layers 106 and 107 via the reverse optical path while keeping the polarizing directions unchanged. The polarizing layers 106 and 107 thus receive light of which polarizing axes are identical to their own polarizing axes, and allow the received light to pass therethrough and to be output from the active matrix substrate 201. Thus, light corresponding to right-eye images and light corresponding to left-eye images are output as two types of light of which polarizing axes are perpendicular to each other.

With the liquid crystal display device 200 with the above configuration, the observer can perceive three-dimensional images output from the side of the active matrix substrate 201 by wearing a pair of polarizing glasses (not shown) which includes polarizing plates having the polarizing axes corresponding to the polarizing axes of the polarizing layers 106 and 107. When the observer does not wear the pair of polarizing glasses, he or she observes two-dimensional images.

The liquid crystal display device 200 of Example 2 which is of a reflective type using ambient light requires no light source for illumination (backlight).

Therefore, a three-dimensional image display device with reduced power consumption is realized, allowing the three-dimensional image display device to be used for a wider range of applications including apparatus driven with a battery.

Moreover, in the reflective liquid crystal display device 200 of Example 2, the light reflection layer 224 is formed on the inner surface of the transparent insulating substrate 102a. This eliminates the occurrence of blur of pixel outlines caused by shadows of pixels due to the thickness of the transparent insulating substrate 102a, and thus good display quality can be obtained.

Figure 5:
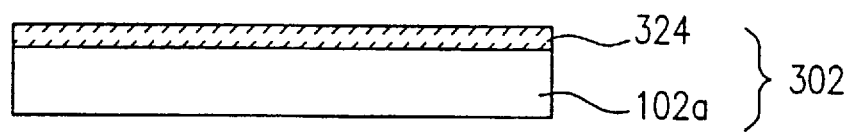
FIG. 5 is a sectional view of an alternative configuration of a counter substrate of the reflective liquid crystal display device of Example 2.

In Examples 1 and 2, the reflective liquid crystal display devices for color image display were described. The present invention is also applicable to reflective liquid crystal display devices for monochromatic display. In the latter case, as shown in FIG. 5, a counter substrate 302 includes the transparent insulating substrate 102a and a light reflection layer 324 made of a metal such as Al which also serves as a counter electrode. The alignment film is omitted in FIG. 5.

The display mode of the liquid crystal layer is not restricted to the guest-host mode as described above. The present invention is also applicable to a liquid crystal display device of a reflective display mode using polarizing plates, such as a reflective-optically compensated bend (R-OCB) mode, a super-twisted nematic (STN) mode, a twisted nematic (TN) mode, and the like.

The present invention is not restricted to the configuration where the polarizing layers and/or the phase layer are disposed in the active matrix substrate, i.e., the substrate where TFTs, lines, and the like are formed. For example, when an STN-mode device where two polarizing plates are used to realize the reflective mode is used, polarizing layers are also formed in the counter substrate, as well as in the active matrix substrate, so that light which has passed through two-stage polarizing layers is reflected by the light reflection layer.

In Examples 1 and 2, each pixel group is composed of one row of pixels aligned in the horizontal direction. The present invention is not restricted to this arrangement, but the same effect as that described above can be obtained when each pixel group is composed of one column of pixels aligned in the vertical direction (i.e., pixels sharing a same source signal line). In the latter case, the polarizing layers 106 and 107, the regions 109 and 110 of the phase layer 108 without and with the phase difference providing function, respectively, the regions 213a and 213b of the alignment film 213, and the regions 214a and 214b of the alignment film 214 are also alternately arranged every column of pixels. Alternatively, each pixel group may be composed of only one pixel, and right-eye pixels and left-eye pixels may be arranged in a checkered flag pattern. Each pixel group may also be composed of a plurality of rows of pixels or a plurality of columns of pixels. In the latter case, however, the resolution is reduced compared with the case where each pixel group is composed of one row of pixels or one column of pixels.

In Examples 1 and 2, two types of linearly polarized light of which polarizing directions are different from each other for the right-eye pixels and the left-eye pixels are output from the active matrix substrate. Alternatively, circularly polarized light may be output. In this case, the phase layer should be disposed on the surface of the polarizing layers closer to the light-incident side of the active matrix substrate, not on the surface of the polarizing layers farther from the light-incident side as in Examples 1 and 2. More specifically, the phase layer composed of the regions corresponding to the right-eye pixels (hereinbelow, referred to as the right-eye regions) and the regions corresponding to the left-eye pixels (hereinafter, referred to as the left-eye regions) is disposed on the surface of the polarizing layers closer to the light-incident side so that the right-eye regions correspond to the polarizing layers for the right eye and the left-eye regions correspond to the polarizing layers for the left eye. At this time, a slow axis of the right-eye regions of the phase layer is arranged to be inclined by 45° in a predetermined direction with respect to the polarizing axis of the polarizing layers for the right eye. Likewise, a slow axis of the left-eye regions of the phase layer is arranged to be inclined by 45° in a direction opposite to the above predetermined direction with respect to the polarizing axis of the polarizing layers for the left eye. The phase layer therefore has the slow axes of the same direction in the right-eye and left-eye regions. The phase difference between the right-eye and left-eye regions is adjusted to be a ¼ wavelength.

In the reflective liquid crystal display device with the above configuration, two types of linearly polarized light of which polarizing directions are perpendicular to each other are output from the polarizing layers for the right and left eyes after being reflected by the light reflection layer disposed on the transparent insulating substrate of the counter substrate and passing through the liquid crystal layer. Such light enters the phase layer and is converted into two types of circularly polarized light of which rotational directions are opposite to each other by the right-eye and left-eye regions of the phase layer. In this way, for example, clockwise circularly polarized light is output from the right-eye regions and counterclockwise circularly polarized light is output from the left-eye regions. The observer who wears a pair of polarizing glasses having circular polarizing plates corresponding to the polarizing states of the right-eye and left-eye regions receives only right-eye images in the right eye and only left-eye images in the left eye. In this case, even if the observer moves his or her head upward or downward or tilts the head, his or her right and left eyes receive right-eye and left-eye images correctly. This eliminates the occurrence of crosstalk causing image doubling, and thus the observer can perceive three-dimensional images with higher display quality.

The reflective liquid crystal display device according to the present invention is not restricted to the direct-view display by portable information terminals, but can also be used for the projection display by projectors, OHPs, and the like. However, the reflective liquid crystal display device according to the present invention is particularly advantageous when used as a display of a portable information terminal, for example, in that the confidentiality of displayed information can be enhanced. This is because, when confidential information is displayed as three-dimensional images, such information cannot be observed by anyone other than an wearer of the pair of polarizing glasses. The displayed three-dimensional images are only observed as doubling blurred images by viewers who do not wear the pair of polarizing glasses.

As described above, the present invention eliminates the generation of crosstalk at the display of three-dimensional images by providing the interlayer insulating film with the polarization selection function. This makes it possible to obtain images with a wide viewing angle and thus to improve the display quality. Since the interlayer insulating film is provided with the polarization selection function, the fabrication process as well as the fabrication cost can be reduced compared with the case where polarizing layers are separately formed.

According to the present invention, three-dimensional image display is realized by a reflective liquid crystal display device by forming a light reflection layer in the counter substrate of the liquid crystal display device. Therefore, a light source for illumination is not required. This provides a thin and lightweight liquid crystal display device with low power consumption, and thereby expands the field for which the three-dimensional image display device is applicable.

In the liquid crystal display device according to the present invention, the interlayer insulating film is constructed of a plurality of regions having the polarization selection function composed of at least one pixel. These regions are arranged so that the directions of the polarizing axes of any adjacent regions are different from each other.

The liquid crystal display device according to the present invention may also be used for a reflective three-dimensional projector. The liquid crystal display device according to the present invention is therefore usable for both direct-view display and projection display. For the direct-view display, the active matrix substrate is positioned to face the observer. For the projection display, the active matrix substrate is positioned to be closer to the light source. This further expands the field for which the liquid crystal display device having the three-dimensional display function is applicable.

Circularly polarized light may be output from the liquid crystal display device by forming the phase layer having the phase difference providing function on the surface of the polarizing layer having the polarization selection function as the interlayer insulating film closer to the light-incident side. This eliminates the generation of crosstalk even when the observer tilts his or her head, and thus further enhances the display quality of three-dimensional images.

Only the wearer of the pair of polarizing glasses can perceive three-dimensional images generated by the reflective liquid crystal display device according to the present invention. This is therefore suitable for the display of images corresponding to confidential information.

EXAMPLE 3

In Example 3, reflective pixel electrodes are provided in the active matrix substrate, at least the phase layer among the polarizing layers and the phase layer is provided in the inner surface portion of the counter substrate, and two types of light with different polarizing states corresponding to right-eye pixels and left-eye pixels are output from the side of the counter substrate, so as to display images. The pixels of the liquid crystal display device of this example are divided into a plurality of groups each composed of at least one pixel. Pixels in the same group are used to display the same image.

Figure 6:
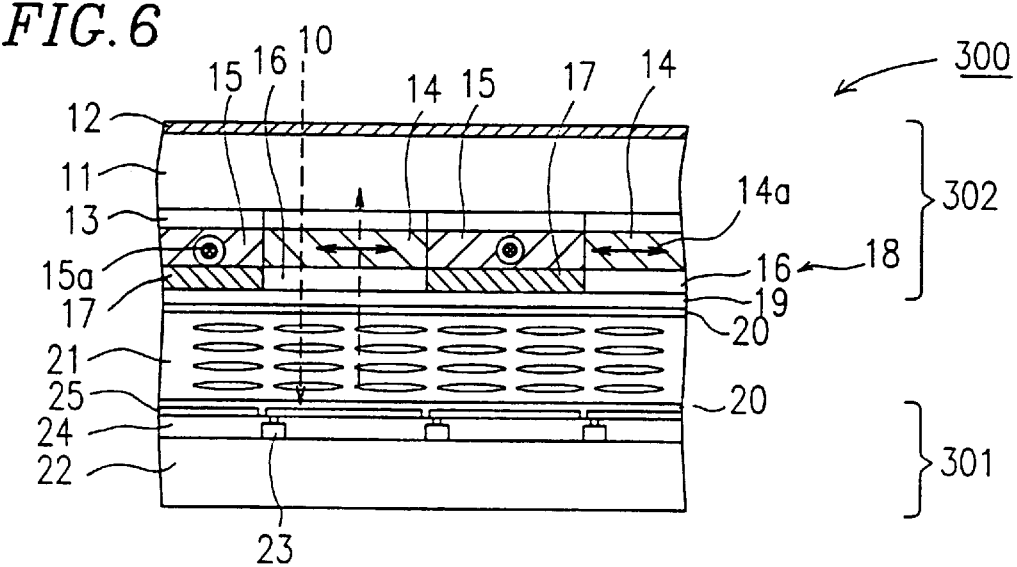
FIG. 6 is a sectional view of a reflective liquid crystal display device of Example 3 according to the present invention.

FIG. 6 is a sectional view schematically showing a reflective liquid crystal display device 300 of Example 3 according to the present invention.

The reflective liquid crystal display device 300 includes an active matrix substrate 301, a counter substrate 302, and a liquid crystal layer 21 interposed between the substrates 301 and 302. The active matrix substrate 301 includes a transparent insulating substrate 22. TFTs 23 as switching elements are formed in a matrix on the surface of the transparent insulating substrate 22 facing the liquid crystal layer 21. An interlayer insulating film 24 is formed on the resultant substrate. Reflective pixel electrodes 25 made of a metal material such as Al or Ag, for example, are formed in a matrix on the interlayer insulating film 24, and connected with the respective TFTs 23 via through holes formed through the interlayer insulating film 24. An alignment film 20 is formed on the resultant substrate. The alignment film 20 is alignment-treated so that liquid crystal molecules in contact with the alignment film 20 are aligned in a same direction over the entire display screen.

Figure 7:
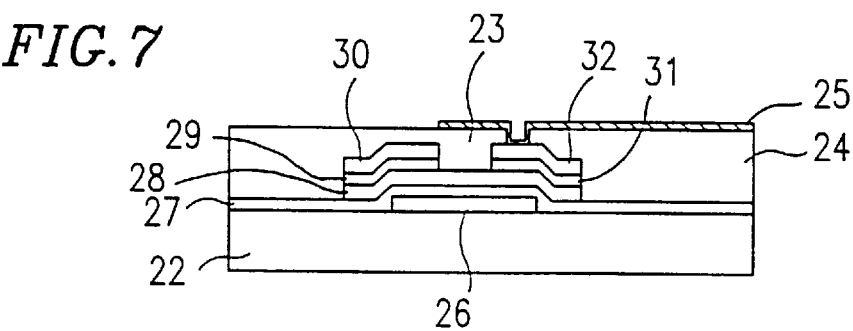
FIG. 7 is a sectional view of one pixel of an active matrix substrate of the reflective liquid crystal display device of FIG. 6.

FIG. 7 shows the portion of the active matrix substrate 301 corresponding to one pixel in more detail.

Gate electrodes 26 and gate signal lines (not shown) connected therewith made of Ta or Al, for example, are formed on the transparent insulating substrate 22. A gate insulating film 27 made of SiN or $SiO_2$, for example, is formed over the gate electrodes 26 and the gate signal lines. Semiconductor layers 28 of the TFTs 23 are formed on the portions of the gate insulating film 27 located above the gate electrodes 26. Contact layers 29 and 31 for source electrodes 30 and drain electrodes 32, respectively, are formed on the semiconductor layers 28 with a space therebetween. For example, amorphous silicon (a-Si) is used for the semiconductor layers 28, and $n^+$-Si is used for the contact layers 29 and 31. The source electrodes 30 are connected to source signal lines (not shown). Thus, the TFTs 23 are completed.

The interlayer insulating film 24 is formed over the entire surface of the transparent insulating substrate 22 covering the TFTs 23. A photosensitive organic material such as a photosensitive acrylic resin, for example, may be used for the interlayer insulating film 24. The through holes are formed through the interlayer insulating film 24 at positions corresponding to the drain electrodes 32. The pixel electrodes 25 made of Al or Ag, for example, are formed in a matrix on the interlayer insulating film 24 so that they are connected with the drain electrodes 32 of the corresponding TFTs 23 through the through holes. The alignment film 20 made of polyimide, for example, is formed over the pixel electrodes 25 and alignment-treated. Thus, the active matrix substrate 301 is completed. The alignment film 20 is alignment-treated so that liquid crystal molecules in contact with the alignment film 20 are aligned in the same direction over the entire display screen.

The configuration of the counter substrate 302 is now described with reference to FIG. 6. Color filters 13 are formed on the inner surface of a transparent insulating substrate 11 facing the liquid crystal layer 21. The color filters 13 may be made of red (R), green (G), and blue (B) pixels, or made of cyan (C), magenta (M), and yellow (Y) pixels, in consideration of the image display by the reflective display device and depending on the field where the display device is applied. Polarizing layers 14 and 15 and a phase layer 18 are formed on the color filters 13.

The polarizing layers 14 and 15 have polarizing axis 14a and 15a, respectively, which are perpendicular to each other, and are disposed so that one of each pair of the polarizing layers 14 or 15 corresponds to a right-eye pixel group while the other one corresponds to a left-eye pixel group. In this example, each pixel group is composed of one row of pixels aligned in the horizontal direction (i.e., pixels sharing a same gate signal line). These pixel groups are allocated for the right eye and the left eye every row of pixels. The polarizing layers 14 and 15 are therefore alternately disposed every row of pixels (i.e, in a shape of horizontal stripes). The phase layer 18 is composed of regions 16 which do not provide a phase difference to incident light and regions 17 which provide a phase difference to incident light. The regions 16 and 17 are arranged to correspond to the polarizing layers 14 and 15, respectively. Thus, the regions 16 and 17 are also alternately formed every row of pixels. The regions 17 having the phase difference providing function have a slow axis shifted by 45° with respect to the polarizing axis 15a of the corresponding polarizing layers 15, thereby providing a phase difference of a half wavelength. By arranging the polarizing layers 14 and 15 and the regions 16 and 17 of the phase layer 18 in the shape of horizontal stripes, the resolution in the horizontal direction is not degraded, though the resolution in the vertical direction lowers to a half. This apparently reduces the lowering of the resolution of the three-dimensional images perceived.

A transparent electrode 19 as the counter electrode and an alignment film 20 alignment-treated in a same direction over the entire surface are formed in this order on the phase layer 18. A reflection blocking layer 12 for blocking the reflection of ambient light may be disposed on the outer surface of the transparent insulating substrate 11 of the counter substrate 302, as required.

The polarizing layers 14 and 15 of the counter substrate 302 are made of a mixture of a photo-oriented organic material and a dichromatic pigment dye or iodide. This material is applied to the resultant surface of the transparent insulating substrate 11 to a predetermined thickness. The applied material is then irradiated with ultraviolet (UV) light including linearly polarized light via a mask disposed on the applied material. The mask has open portions each corresponding to one row of pixels and light-shading portions each corresponding to one row of pixels alternately arranged. The UV light passes through the open portions of the mask to form the polarizing layers in which the polarizing axis is along the polarizing direction of the UV light. Then, the mask is rearranged so that the open portions thereof are located above the portions of the applied material which have not previously been irradiated with the UV light, and is irradiated with UV light including linearly polarized light which polarizes in a direction different from that of the previously-used UV light by 90°. In this way, the polarizing layers in which the polarizing axes are different from each other by 90° are formed alternately in every row of pixels. A polymer material which exhibits a photoisomerization reaction (e.g., a polymer including azobenzene as a side chain) as disclosed in Japanese Laid-Open Publication No. 7-261024 and a dichromatic pigment may be used for the polarizing layers.

The phase layer 18 is formed in substantially the same procedure as the polarizing layers 14 and 15. That is, a photopolymerizable liquid crystal material, for example, is applied to the polarizing layers 14 and 15 to a predetermined thickness. The applied material is irradiated with UV light including linearly polarized light via a mask which has open portions each corresponding to one row of pixels and light-shading portions each corresponding to one row of pixels alternately arranged. The mask is disposed on the applied material so that the open portions correspond to the portions of the applied material which are to be the regions 17 having the phase difference providing function. Thus, the regions 17 which have an optical axis along the polarizing direction of the incident UV light and provide a phase difference of a half wavelength are formed. A UV-curable liquid crystal material exhibiting the nematic phase at room temperature as disclosed in Japanese Laid-Open Publication No. 8-29618 may be used for the phase layer.

The liquid crystal layer 21 is made of a guest-host mode liquid crystal material. In this example, a mixture of a p-type black pigment as a dichromatic pigment and a nematic liquid crystal material having a positive dielectric anisotropy is used. The liquid crystal molecules and the dichromatic pigment molecules are aligned so that the optical absorption axis of the dichromatic pigment molecules obtained when the liquid crystal molecules and the dichromatic pigment molecules have been aligned is parallel to the polarizing direction of light which has passed through the polarizing layers and the phase layer. With this alignment, polarized light incident on the liquid crystal layer 21 is absorbed by the dichromatic pigment molecules when the TFTs 23 are in the OFF state, i.e., when no electric field is applied to the liquid crystal layer 21, resulting in black display. When the TFTs 23 are in the ON state, i.e., when an electric field is applied to the liquid crystal layer 21, the orientation directions of the liquid crystal molecules and the dichromatic pigment molecules change depending on the electric field. Polarized light incident on the liquid crystal layer 21 therefore passes through the liquid crystal layer 21 without being absorbed by the dichromatic pigment molecules.

In the reflective liquid crystal display device 300 with the above configuration, ambient light is incident on the counter substrate 302, and converted into two types of linearly polarized light of which polarizing axes are perpendicular to each other by passing through the polarizing layers 14 and 15 formed alternately every row of pixels. The two types of light then pass through the phase layer 18, where the polarizing direction of one of the two types of linearly polarized light is made the same as that of the other type of linearly polarized light. The resultant two types of light enter the liquid crystal layer 21. Accordingly, the amount of light passing through the liquid crystal layer 21 can be adjusted for the entire screen by controlling the liquid crystal layer 21.

More specifically, when the TFTs 23 are in the OFF state, light is absorbed and thus black display is obtained. On the contrary, when the TFTs 23 are in the ON state, light passes through the liquid crystal layer 21, and is reflected by the reflective pixel electrodes 25 to be incident on the phase layer 18 again via the reverse optical path while the polarizing directions of the light being held. The light which is incident on the regions 17 of the phase layer 18 having the phase difference providing function is provided with a phase difference of a half wavelength, and becomes light in which the polarizing direction has been rotated by 90°. Accordingly, two types of linearly polarized light of which polarizing directions are perpendicular to each other are output from the phase layer 18 alternately every row of pixels. The polarizing layers 14 and 15 receive these two types of linearly polarized light which are polarized in the directions identical to the directions of their own polarizing axes. As a result, light corresponding to the right-eye images and light corresponding to the left-eye images are output from the counter substrate 302 as two types of linearly polarized light which are polarized in the directions perpendicular to each other.

As described above, the reflective liquid crystal display device 300 of Example 3 also outputs two types of light for right-eye images and left-eye images alternately every row of pixels. In the reflective liquid crystal display device 300 with the above configuration, the observer can perceive three-dimensional images from the side of the counter substrate 302 by wearing a pair of polarizing glasses (not shown) which include polarizing plates having the polarizing axes corresponding to the polarizing axes of the polarizing layers 14 and 15. The liquid crystal display device 300 of Example 3 which is of a reflective type using ambient light requires no light source for illumination (backlight). This provides a liquid crystal display device with low power consumption, and thereby expands the field for which the three-dimensional image display device is applicable.

The reflective liquid crystal display device 300 of Example 3 can also be used to display normal two-dimensional images by applying image signals to pixels in a known manner. In this case, of course, the observer is not required to wear a pair of polarizing glasses.

In the reflective liquid crystal display device 300 of Example 3, the pixel electrodes formed inside the display device, i.e., in the inner surface portion of the active matrix substrate 301, are used as the light reflection layer. This eliminates the generation of blur of pixel outlines caused by the thickness of the transparent insulating substrate 22, and thus good display quality can be obtained.

In this example, the switching elements for driving pixels are provided for all pixels. The present invention is also applicable to other types of display modes such as a twisted nematic mode. When the guest-host display mode is employed, a high voltage ON/OFF ratio is required at the driving of liquid crystal to obtain a high contrast ratio. In Example 3, the voltage ON/OFF ratio at the driving of liquid crystal can be made high by providing the switching elements in the substrate. As a result, a high contrast ratio and thus improved display quality can be obtained.

EXAMPLE 4

A reflective liquid crystal display device of Example 4 will be described with reference to FIG. 8.

Figure 8:
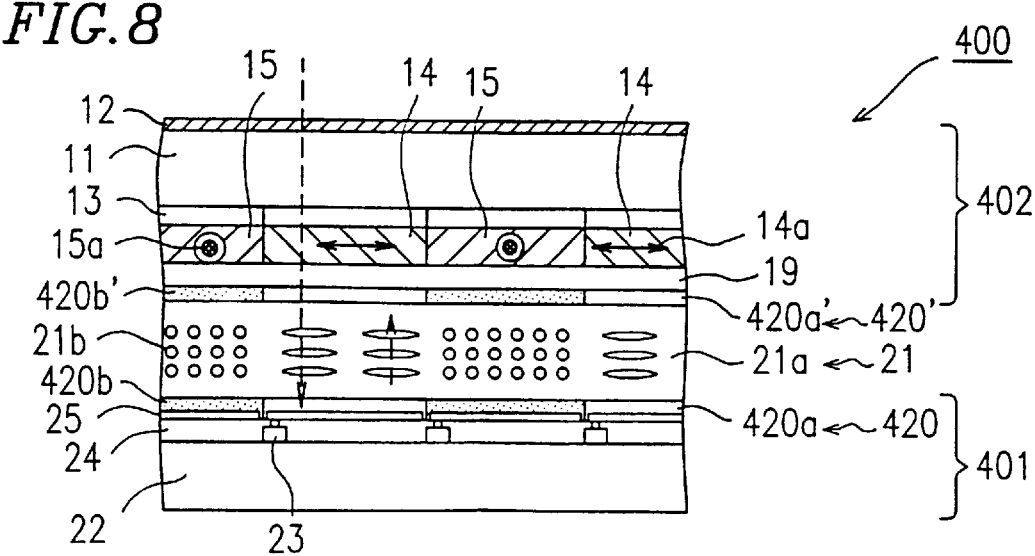
FIG. 8 is a sectional view of a reflective liquid crystal display device of Example 4 according to the present invention.

FIG. 8 is a sectional view schematically showing a reflective liquid crystal display device 400 of Example 4 according to the present invention. In Figure 8, the same components as those shown in FIGS. 6 and 7 are denoted by the same reference numerals, and the description thereof is omitted here.

The reflective liquid crystal display device 400 includes an active matrix substrate 401, a counter substrate 402, and a liquid crystal layer 21 interposed between the substrates 401 and 402. The configuration of the active matrix substrate 401 is the same as that in Example 3, except that an alignment film 420 is different from the alignment film 20 in Example 3. The alignment film 420 is composed of regions 420a and 420b which have been alignment-treated differently from each other so that the regions 420a correspond to right-eye pixels and the regions 420b correspond to left-eye pixels. As in Example 3, rows of pixels aligned in the horizontal direction are alternately allocated for the right eye and the left eye every row of pixels. Thus, the regions 420a and 420b of the alignment film 420 are also arranged alternately every row of pixels. The regions 420a and 420b of the alignment film 420 are alignment-treated so that the orientation directions of liquid crystal molecules in contact with the regions 420a and 420b are perpendicular to each other.

The configuration of the counter substrate 402 in Example 4 is the same as that in Example 3, except that the phase layer is omitted in Example 4 and that an alignment film 420' in Example 4 is different from the alignment film 20 in Example 3. As the alignment film 420 of the active matrix substrate 401, the alignment film 420' is composed of regions 420a' and 420b' corresponding to right-eye pixels and left-eye pixels, respectively. The regions 420a' and 420b' of the alignment film 420' have been alignment-treated differently from each other so that the orientation directions of liquid crystal molecules in contact with the regions 420a' and 420b' are perpendicular to each other, and arranged alternately every row of pixels. Thus, the regions 420a' of the alignment film 420' correspond to the regions 420a of the alignment film 420, while the regions 420b' of the alignment film 420' correspond to the regions 420b of the alignment film 420. The alignment directions of the regions of the alignment films 420 and 420' are determined so that the opposing regions 420a and 420a' (or 420b and 420b') regulate the orientation direction of liquid crystal molecules 21a (or 21b) in the liquid crystal layer 21 interposed between these regions in a same direction.

The liquid crystal layer 21 is made of a guest-host mode liquid crystal material as in Example 3. In this example, a mixture of a p-type black pigment as a dichromatic pigment and a nematic liquid crystal material having a positive dielectric anisotropy is used. The orientation direction of the liquid crystal molecules 21a interposed between the regions 420a of the alignment film 420 and the regions 420a' of the alignment film 420' is perpendicular to the orientation direction of the liquid crystal molecules 21b interposed between the regions 420b of the alignment film 420 and the regions 420b' of the alignment film 420'. For the entire display screen, the regions of the liquid crystal layer 21 having the orientation directions perpendicular to each other are alternately formed every row of pixels. In this way, the polarizing direction of light incident on the liquid crystal layer 21 after passing through the polarizing layers 14 and 15 of the counter substrate 402 can be made in parallel with the absorption axis of the dichromatic pigment molecules in the liquid crystal layer 21 obtained when no electric field is applied to the liquid crystal layer 21.

The light orientation method was used as an alignment treatment method for the alignment films 420 and 420'. That is, an alignment material such as a photosensitive resin, e.g., polyvinyl cinnamate, is applied to the resultant surfaces of the transparent insulating substrate 22 of the active matrix substrate 401 and the transparent insulating substrate 11 of the counter substrate 402 to a predetermined thickness. The applied material of each of the substrates 401 and 402 is irradiated with ultraviolet (UV) light including linearly polarized light in vertical and inclined directions via a mask disposed on the applied material. The mask has open portions and light-shading portions alternately arranged to correspond to every row of pixels. In this way, the regions 420a, 420b, 420a', and 420b' having alignment directions along the polarizing directions of the irradiated light are formed.

In the reflective liquid crystal display device 400 with the above configuration, ambient light incident on the counter substrate 402 is converted into two types of linearly polarized light of which polarizing directions are perpendicular to each other after passing through the polarizing layers 14 and 15 formed alternately every row of pixels. The linearly polarized light then passes through the alignment film 420' to be incident on the liquid crystal layer 21. Since the orientation directions of the liquid crystal molecules in the liquid crystal layer 21 are perpendicular to each other every row of pixels so as to correspond to the polarizing axes of the polarizing layers 14 and 15, the amount of light passing through the liquid crystal layer 21 can be adjusted over the entire screen by adjusting the orientation directions of the liquid crystal molecules and the dichromatic pigment molecules. More specifically, when the TFTs are in the OFF state, light is absorbed and thus a black display is obtained. On the contrary, when the TFTs are in the ON state, light passes through the liquid crystal layer 21 and is reflected by the reflective pixel electrodes 25.

The light reflected by the reflective pixel electrode 25 is incident on the polarizing layers 14 and 15 again via the reverse optical path while the polarizing directions of the light are held. Thus, the polarizing layers 14 and 15 receive the types of light of which polarizing directions are identical to the directions of their own polarizing axes. The polarizing layers 14 and 15 therefore allow the incident light to pass therethrough, and the light is output from the counter substrate 402. In this way, light corresponding to the right-eye images and light corresponding to the left-eye images are output as two types of linearly polarized light which are polarized in the directions perpendicular to each other.

In the reflective liquid crystal display device 400 with the above configuration, the observer can perceive three-dimensional images output from the side of the counter substrate 402 by wearing a pair of polarizing glasses (not shown) which include polarizing plates having the polarizing axes corresponding to the polarizing axes of the polarizing layers 14 and 15. The reflective liquid crystal display device 400 of Example 4 can also be used to display normal two-dimensional images by applying image signals to pixels in a known manner. In this case, of course, the observer is not required to wear a pair of polarizing glasses.

The liquid crystal display device 400 of Example 4 which is of a reflective type using ambient light requires no light source for illumination (backlight). This provides a liquid crystal display device with low power consumption, and thereby expands the field for which the three-dimensional image display device is applicable. Moreover, the pixel electrodes 25 formed in the inner surface portion of the active matrix substrate 401 are used as the light reflection layer. This eliminates the generation of blur of pixel outlines caused by the thickness of the transparent insulating substrate 22, and thus good display quality can be obtained.

Figure 15:
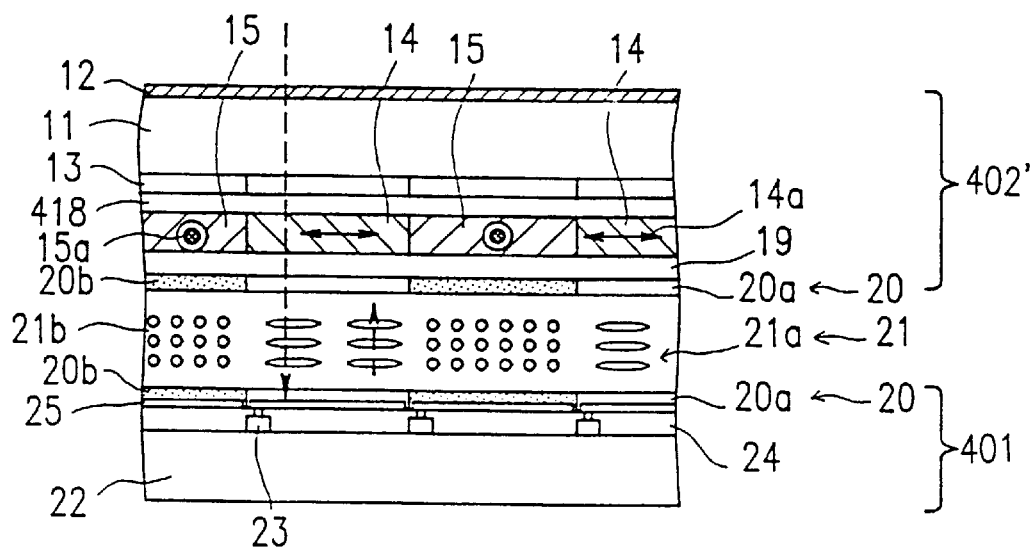
FIG. 15 is a sectional view of an alternative example of the reflective liquid crystal display device of Example 4 according to the present invention.

In Example 4, two types of linearly polarized light of which polarizing directions are different from each other for the right-eye pixels and the left-eye pixels are output from the counter substrate. Alternatively, circularly polarized light may be output. In this case, as shown in FIG. 15, a phase layer 418 which serves as a filter of circularly polarized light is disposed on the surface of the polarizing layers 14 and 15 closer to the light-incident side of a counter substrate 402' (i.e., closer to the transparent insulating substrate 11).

More specifically, the phase layer 418 composed of right-eye regions and left-eye regions is disposed on the surface of the polarizing layers closer to the light-incident side so that the right-eye regions correspond to the polarizing layers 14 for the right eye and the left-eye regions correspond to the polarizing layers 15 for the left eye. At this time, a slow axis of the right-eye regions of the phase layer 418 is arranged to be inclined by 45° with respect to the polarizing axis 14a of the polarizing layers 14 in a predetermined direction. Likewise, a slow axis of the left-eye regions of the phase layer 418 is arranged to be inclined by 45° with respect to the polarizing axis 15a of the polarizing layers 15 in a direction opposite to the above predetermined direction. The phase layer 418 therefore has the slow axes of the same direction in the right-eye and left-eye regions. The phase difference between the right-eye and left-eye regions is adjusted to be a ¼ wavelength.

In the reflective liquid crystal display device with the above configuration, two types of linearly polarized light of which polarizing directions are perpendicular to each other are output from the polarizing layers 14 and 15 for the right and left eyes after being reflected by the reflective pixel electrodes 25 and passing through the liquid crystal layer 21. Such light enters the phase layer 418 and is converted into two types of circularly polarized light of which rotational directions are opposite to each other by the right-eye and left-eye regions of the phase layer 418. In this way, for example, clockwise circularly polarized light is output from the right-eye regions and counterclockwise circularly polarized light is output from the left-eye regions. The observer who wears a glass of polarizing glasses having circularly polarizing plates corresponding to the polarizing states of the right-eye and left-eye regions receives only right-eye images in the right eye and only left-eye images in the left eye. In this case, even if the observer moves his or her head upward or downward or tilts the head, his or her right and left eyes receive light-eye and left-eye images correctly. This eliminates the generation of crosstalk causing image doubling, and thus the observer can perceive three-dimensional images with higher display quality.

In Example 4, the guest-host display mode was employed. The present invention is also applicable to other types of display modes such as the twisted nematic mode.

EXAMPLE 5

Figure 9:
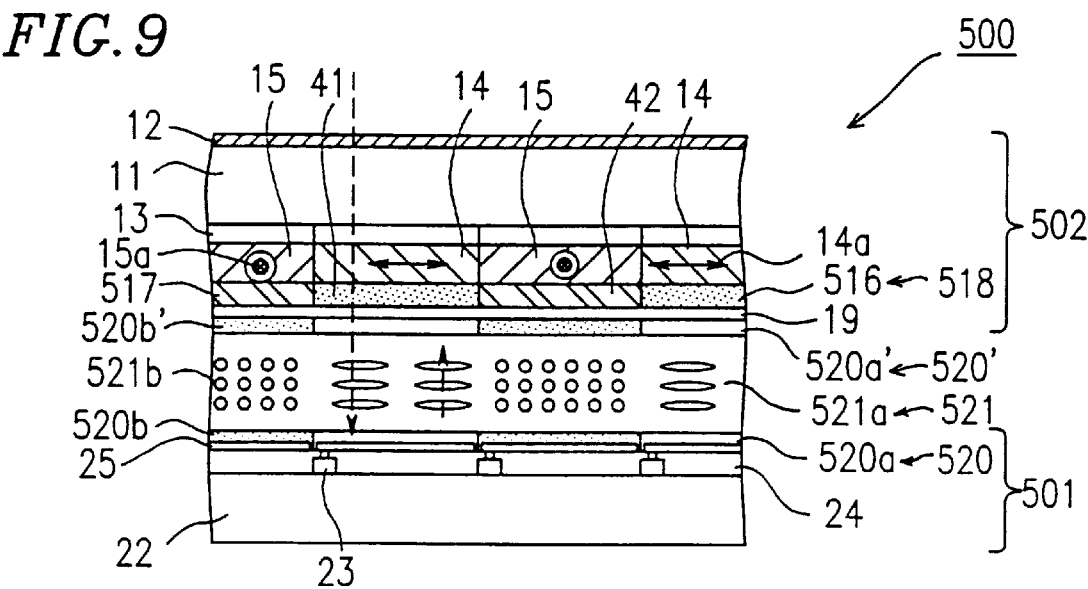
FIG. 9 is a sectional view of a reflective liquid crystal display device of Example 5 according to the present invention.
Figure 10:
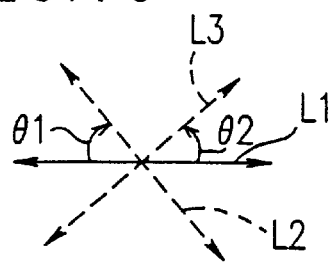
FIG. 10 shows an optical arrangement of the reflective liquid crystal display device of FIG. 9.
Figure 11A:
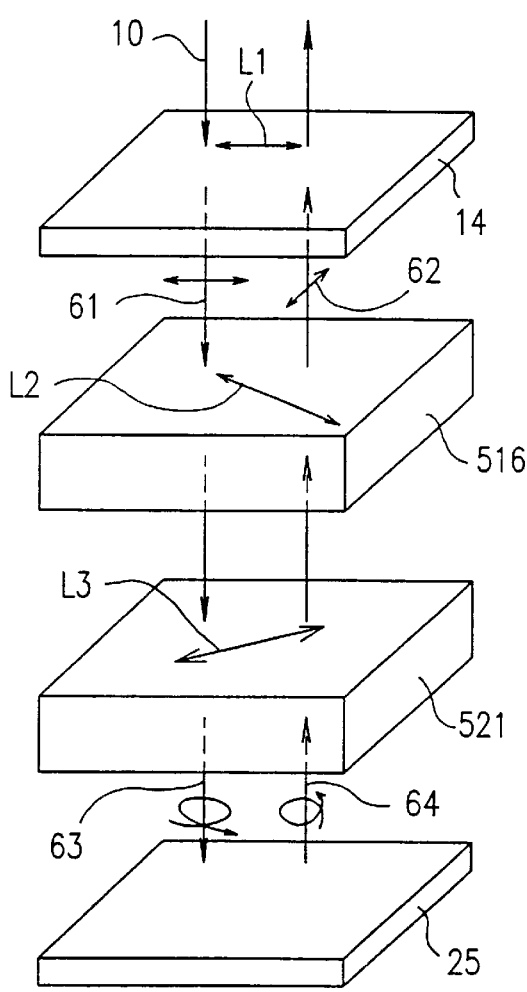
FIGS. 11A and 11B illustrate the operational principle of the reflective liquid crystal display device of FIG. 9 when no voltage is applied and when a voltage is applied, respectively.
Figure 11B:
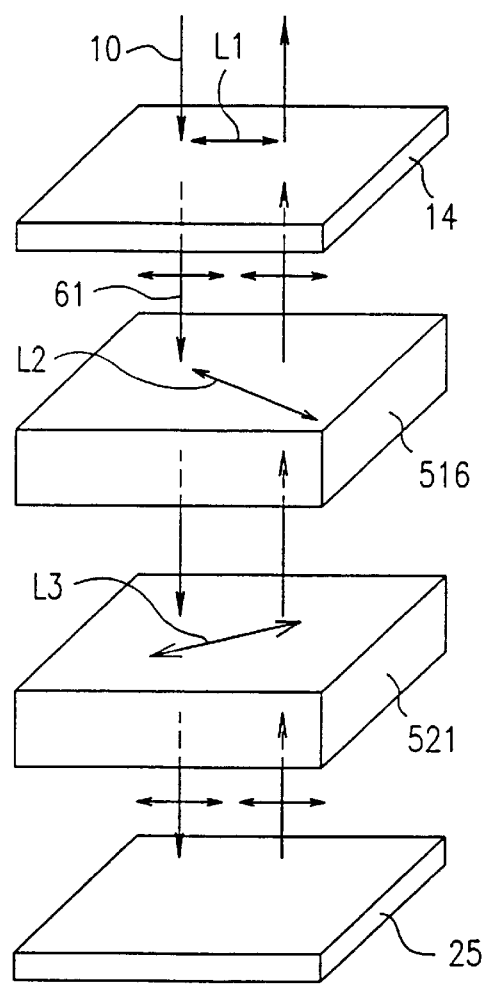

A reflective liquid crystal display device of Example 5 will be described with reference to FIGS. 9 to 11. In FIGS. 9 to 11A and 11B, the same components as those shown in FIGS. 6 to 8 are denoted by the same reference numerals, and the description thereof is omitted here.

FIG. 9 is a sectional view schematically showing a reflective liquid crystal display device 500 of Example 5 according to the present invention.

The reflective liquid crystal display device 500 includes an active matrix substrate 501, a counter substrate 502, and a liquid crystal layer 521 interposed between the substrates 501 and 502. The configuration of the active matrix substrate 501 is the same as that in Example 3, except that an alignment film 520 is different from the alignment film 20 in Example 3. As in Example 4, the alignment film 520 is composed of regions 520a and 520b which have been alignment-treated differently from each other so that the regions 520a correspond to right-eye pixels and the regions 520b correspond to left-eye pixels. As in the previous examples, rows of pixels aligned in the horizontal direction are alternately allocated for the right eye and the left eye every row of pixels. Thus, the regions 520a and 520b of the alignment film 520 are also arranged alternately every row of pixels. The regions 520a and 520b of the alignment film 520 are alignment-treated so that the orientation directions of liquid crystal molecules in contact with the regions 520a and 520b are perpendicular to each other.

The counter substrate 502 includes a transparent insulating substrate 11. Color filters 13, polarizing layers 14 and 15, a phase layer 518, a counter electrode 19, and an alignment film 520' are formed in this order on the inner surface of the transparent insulating substrate 11 facing the liquid crystal layer 521. A reflection blocking layer 12 for blocking the reflection of ambient light may be disposed on the outer surface of the transparent insulating substrate 11 of the counter substrate 502, as required.

The color filters 13 may be made of red (R), green (G), and blue (B) pixels, or made of cyan (C), magenta (M), and yellow (Y) pixels, in consideration of the image display by the reflective display device and depending on the field where the reflective liquid crystal display device 500 is applied.

The polarizing layers 14 and 15 have the polarizing axes 14a and 15a perpendicular to each other, and are alternately disposed every row of pixels (i.e, in the shape of horizontal stripes) so that the polarizing layers 14 correspond to right-eye pixels and the polarizing layers 15 correspond to left-eye pixels, as in Example 3. The polarizing layers 14 and 15 are formed in the manner described in Example 3.

The phase layer 518 is composed of regions 516 and 517 having slow axes perpendicular to each other. The phase layer 518 is formed in the manner described in Example 3. As shown in FIG. 9, the regions 516 and 517 are arranged to correspond to the polarizing layers 14 and 15, respectively, and thus arranged alternately every row of pixels. The slow axis of the regions 516 is rotated by 45° clockwise with respect to the polarizing axis 14a of the polarizing layers 14. Likewise, the slow axis of the regions 517 is rotated by 45° clockwise with respect to the polarizing axis 15a of the polarizing layers 15.

A transparent electrode 19 as the counter electrode and an alignment film 520' are formed on the phase layer 518. The alignment film 520' is composed of regions 520a' and 520b' which are alignment-treated differently so that liquid crystal molecules in contact with these regions are aligned in directions different from each other. As shown in FIG. 9, the regions 520a' and 520b' are also arranged alternately every row of pixels to correspond to the regions 520a and 520b of the alignment film 520 of the active matrix substrate 501, respectively. The regions 520a' are alignment-treated so that the liquid crystal molecules in contact therewith are aligned in a direction rotated by 45° counterclockwise with respect to the polarizing axis 14a of the corresponding polarizing layers 14. Likewise, the regions 520b' are alignment-treated so that the liquid crystal molecules in contact therewith are aligned in a direction rotated by 45° counterclockwise with respect to the polarizing axis 15a of the corresponding polarizing layers 15. The opposing regions of the alignment films 520 and 520' are treated so that the liquid crystal molecules interposed therebetween are aligned in the same direction.

FIG. 10 shows an optical configuration of the reflective liquid crystal display device 500. An axial direction L2 of the slow axis of the regions 516 (or 517) of the phase layer 518 is set at an angle θ1 clockwise with respect to an axial direction L1 of the polarizing axis 14a (or 15a) of the corresponding polarizing layer 14 (or 15). An orientation direction L3 of liquid crystal molecules 521a (or 521b) in the corresponding regions is set at an angle θ2 counterclockwise with respect to the axial direction L1. In this example, both angles θ1 and θ2 are 45°.

The photo-orientation method is employed for the alignment treatment of the alignment films 520 and 520', as in Example 4. Specifically, a photosensitive resin, e.g., polyvinyl cinnamate, is applied to the resultant surfaces of the transparent insulating substrate 22 of the active matrix substrate 501 and the transparent insulating substrate 11 of the counter substrate 502 to a predetermined thickness. The applied material of each of the substrates 501 and 502 is irradiated with ultraviolet (UV) light including linearly polarized light in vertical and inclined directions via a mask disposed on the applied material. The mask has open portions and light-shading portions alternately arranged to correspond to every row of pixels. In this way, the regions 520*a*, 520*b*, 520*a*', and 520*b*' having alignment directions along the polarizing directions of the irradiated light are formed.

A material of an electric field control birefringence (ECB) mode may be used for the liquid crystal layer 521. In this example, as a liquid crystal material with a positive dielectric anisotropy, ZLI4792 (Merck & Co., Inc.) with a refractive index anisotropy Δn1 of 0.094 is used, to form the liquid crystal layer 521 with a thickness d1 of 5.5 μm. Therefore, a retardation Δn1·d1 of the liquid crystal layer 521 is 517 nm. In correspondence with this retardation, a retardation Δn2·d21 of the phase layer 518 (with an optical anisotropy Δn2 and a thickness d2) is set to satisfy (Δn1·d−Δn2·d2)/λ= 0.25 when light with a wavelength λ of 550 nm is incident on the phase layer 518. Specifically, Δn2·d2 is set at 380 nm. With this setting, a black display is obtained when the TFTs 23 are in the OFF state, in which polarized light reflected by the reflective pixel electrodes 25 of the active matrix substrate 501 is blocked from passing through the polarizing layers 14 and 15. On the contrary, a white display is obtained when the TFTs 23 are in the ON state, in which polarized light reflected by the reflective pixel electrodes 25 is allowed to pass through the polarizing layers 14 and 15. The setting of the value of (Δn1·d1·Δn2·d2)λ is not limited to the above value, but any setting is possible as far as monochromatic display is achieved.

FIGS. 11A and 11B illustrate the operational principle of the reflective liquid crystal display device 500 of Example 5. In FIGS. 11A and 11B, the liquid crystal display device 500 is exploded to facilitate the description of the operational principle.

FIG. 11A shows the state in which reflected light is blocked. Incident light 10 which has passed through the polarizing layer 14 is converted into linearly polarized light 61 having a polarizing direction parallel to the direction L1 of the polarizing axis of the polarizing layer 14. The linearly polarized light 61 then passes through the region 516 of the phase layer 518 and the liquid crystal layer 521 to be output as clockwise circularly polarized light 63, for example. The circularly polarized light 63 is reflected by the reflective pixel electrode 25 and converted into counterclockwise circularly polarized light 64. The circularly polarized light 64 passes back through the liquid crystal layer 521 and the region 516 of the phase layer 518 having the respective retardations described above, to be output as linearly polarized light 62 having a polarizing direction perpendicular to the polarizing direction of the linearly polarized light 61. The linearly polarized light 62 is therefore blocked from passing through the polarizing layer 14. Thus, a black display is obtained. In the case where the light incident on the reflective pixel electrode 25 after passing through the liquid crystal layer 521 is counterclockwise circularly polarized light, the light reflected from the reflective pixel electrode 25 is clockwise polarized light.

FIG. 11B shows the state in which reflected light is transmitted. When the TFT 23 is turned into the ON state to allow a voltage to be applied to the liquid crystal layer 521, the orientation of the liquid crystal molecule 521*a* is changed to satisfy the relationship between the retardations of the phase layer 518 and the liquid crystal layer 521, (Δn1·d1−Δn2·d2)λ=0±0.1. Under this state, the linearly polarized light 61 having the polarizing direction parallel to the polarizing axis 14*a* of the polarizing layer 14 is allowed to pass through the region 516 of the phase layer 518 and the liquid crystal layer 521 while holding the polarizing state. The polarizing state of the linearly polarized light 61 is also held when it is reflected by the reflective pixel electrode 25 and when it passes back through the liquid crystal layer 521 and the region 516 of the phase layer 518. The reflected light with this polarizing state is allowed to pass through the polarizing layer 14 to be output from the device. Thus, a white display is obtained.

As described above, in the reflective liquid crystal display device 500, light corresponding to the right-eye images and light corresponding to the left-eye images are output from the side of the counter substrate 502 as two types of linearly polarized light which are polarized in the directions perpendicular to each other. Accordingly, the observer can perceive three-dimensional images from the side of the counter substrate 502 by wearing a pair of polarizing glasses (not shown) which include polarizing plates having the polarizing axes corresponding to the polarizing axes of the polarizing layers 14 and 15. When the observer does not wear the pair of polarizing glasses, the observer observes two-dimensional images.

In Example 5, since the ECB display mode is employed, gray-scale display is also possible.

The liquid crystal display device 500 of Example 5 which is of a reflective type using ambient light requires no light source for illumination (backlight). This provides a liquid crystal display device with low power consumption, and thereby expands the field for which the three-dimensional image display device is applicable. Moreover, since the polarizing layers and the phase layer are formed in the inner surface portion of the counter substrate 502, the generation of crosstalk caused by the thickness of the transparent insulating substrate 11 is eliminated, and thus good display quality can be obtained. Furthermore, since the switching elements are provided, the voltage ON/OFF ratio at the driving of liquid crystal can be made high. As a result, a high contrast and thus improved display quality can be obtained.

The liquid crystal display device which includes the phase layer having the phase difference providing function can employ a wider range of display modes. For example, the reflective liquid crystal display device 500 of Example 5 may employ the guest-host mode or the twisted nematic mode, in place of the ECB mode. The configuration of the components of the liquid crystal display device 500 may be changed depending on the display mode employed.

EXAMPLE 6

Figure 12:
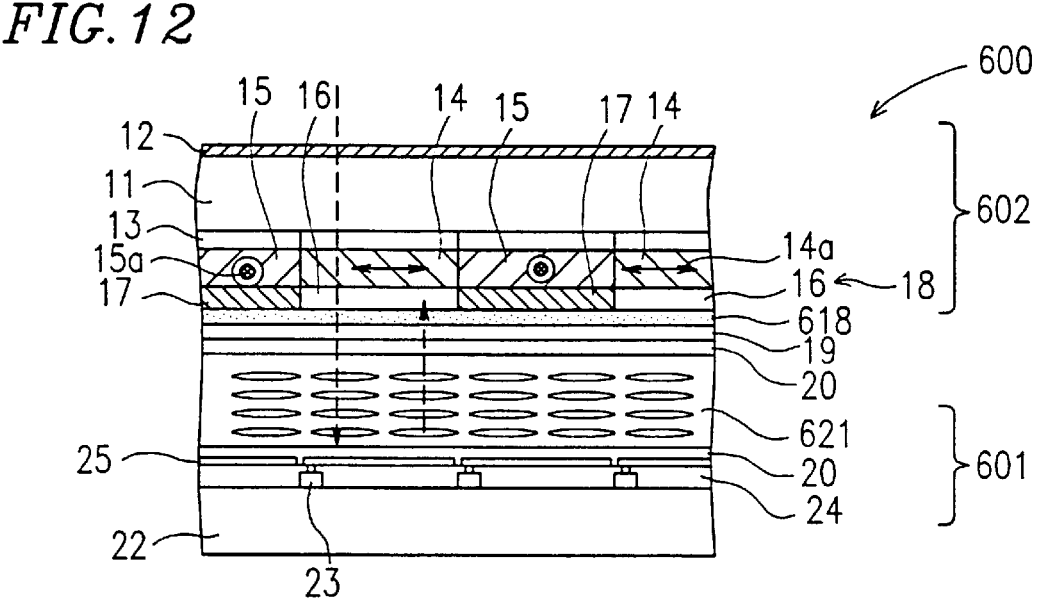
FIG. 12 is a sectional view of a reflective liquid crystal display device of Example 6 according to the present invention.
Figure 13:
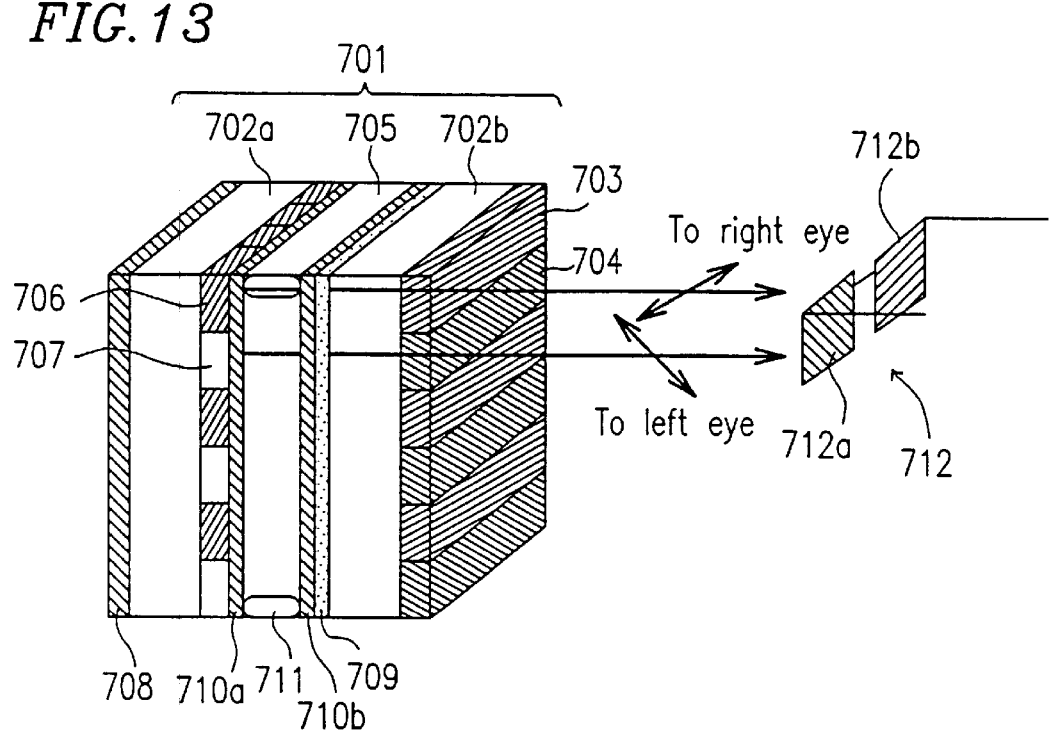
FIG. 13 is a conceptual view of a conventional liquid crystal display device with a three-dimensional display function using a pair of polarizing glasses.
Figure 14:
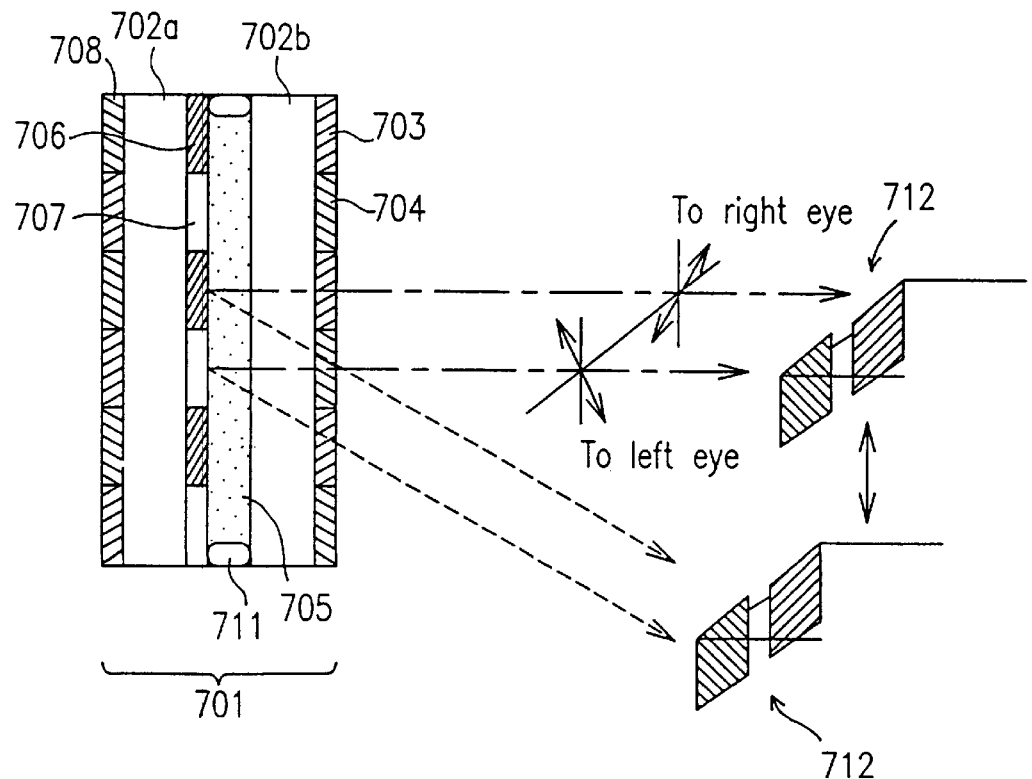
FIG. 14 illustrates the generation of crosstalk in the conventional liquid crystal display device of FIG. 13.

A reflective liquid crystal display device of Example 6 will be described with reference to FIG. 12. In FIG. 12, the same components as those shown in FIGS. 6 to 11A and 11B are denoted by the same reference numerals, and the description thereof is omitted here.

FIG. 12 is a sectional view schematically showing a reflective liquid crystal display device 600 of Example 6 according to the present invention.

The reflective liquid crystal display device 600 includes an active matrix substrate 601, a counter substrate 602, and a liquid crystal layer 621 interposed between the substrates 601 and 602. The configuration of the active matrix substrate 601 is the same as that in Example 3. The alignment film 20 is alignment-treated so that liquid crystal molecules in contact with the alignment film 20 are oriented in the same direction over the entire display screen.

The configuration of the counter substrate 602 in Example 6 is the same as the counter substrate 102 in Example 3, except that an additional phase layer 618 is provided between the phase layer 18 and the counter electrodes 19.

The polarizing layers 14 and 15 have the polarizing axes 14*a* and 15*a* perpendicular to each other, and are alternately disposed so that the polarizing layers 14 correspond to right-eye pixels and the polarizing layers 15 correspond to left-eye pixels. In Example 6, as in Example 3, rows of pixels aligned in the horizontal direction are alternately allocated for the right eye and the left eye every row of pixels. Thus, the polarizing layers 14 and 15 are alternately disposed every row of pixels (i.e, in the shape of horizontal stripes). The phase layer 18 is composed of regions 16 which do not provide a phase difference to incident light and regions 17 which provide a phase difference to incident light. The regions 16 and 17 are arranged alternately every row of pixels to correspond to the polarizing layers 14 and 15, respectively, as shown in FIG. 12. The regions 17 have a slow axis rotated by 45° with respect to the polarizing axis 15$a$ of the corresponding polarizing layers 15, thereby providing incident light with a phase difference of a half wavelength.

The phase layer 618 is formed on the entire surface of the phase layer 18. The slow axis of the phase layer 618 is set to be rotated by 45° clockwise with respect to the polarizing axis 14$a$ of the polarizing layers 14. The phase layer 618 may be made of a UV-curable liquid crystal material exhibiting the nematic phase at room temperature as disclosed in Japanese Laid-Open Publication No. 8-29618.

A transparent electrode 19 as the counter electrode and an alignment film 20 are formed in this order on the phase layer 618. As described above, the alignment film 20 is alignment-treated so that the liquid crystal molecules in contact with the alignment film 20 are aligned in the same direction. The alignment direction of the alignment film 20 of the counter substrate 602 is set so as to be rotated by 45° counterclockwise with respect to the polarizing axis 14$a$ of the corresponding polarizing layers 14. An alignment film 20 of the active matrix substrate 601 is set in accordance with the twist angle of the liquid crystal layer 621.

An ECB mode material may be used for the liquid crystal layer 621. In this example, as a liquid crystal material with a positive dielectric anisotropy, ZLI4792 (Merck & Co., Inc.) with a refractive index anisotropy $\Delta n1$ of 0.094 is used, to form the liquid crystal layer 621 with a thickness d1 of 5.5 $\mu$m. Therefore, a retardation $\Delta n1 \cdot d1$ of the liquid crystal layer 621 is 517 nm. In correspondence with this retardation, a retardation $\Delta n2 \cdot d2$ of the phase layer 618 (with an optical anisotropy $\Delta n2$ and a thickness d2) is set to satisfy ($\Delta n1 \cdot d1 - \Delta n2 \cdot d2$)/$\lambda$=0.5 when light with a wavelength $\lambda$ of 550 nm is incident on the phase layer 618. Specifically, $\Delta n2 \cdot d2$ is set at 240 nm. With this setting, a white display is obtained when the TFTs 23 are in the OFF state, in which polarized light reflected by the reflective pixel electrodes 25 of the active matrix substrate 601 is allowed to pass through the polarizing layers 14 and 15. On the contrary, a black display is obtained when the TFTs 23 are in the ON state, in which polarized light reflected by the reflective pixel electrodes 25 is blocked from passing through the polarizing layers 14 and 15. The setting of the value of ($\Delta n1 \cdot d1 \Delta n2 \cdot d2$)/$\lambda$ is not limited to the above value, but any setting is possible as far as monochromatic display is achieved.

As described above, in the reflective liquid crystal display device 600 of Example 6, light corresponding to the right-eye images and light corresponding to the left-eye images are output as two types of linearly polarized light which are polarized in the directions perpendicular to each other. Accordingly, the observer can perceive three-dimensional images from the side of the counter substrate 602 by wearing a pair of polarizing glasses (not shown) which include polarizing plates having the polarizing axes corresponding to the polarizing axes of the polarizing layers 14 and 15. When the observer does not wear the pair of polarizing glasses, the observer observes two-dimensional images.

In Example 6, since the ECB display mode is employed, a gray-scale display is also possible. Alternatively, a nematic liquid crystal material twisted by 240° (e.g., SD-4107 manufactured by Chisso Corporation) may be used for the liquid crystal layer to realize the twisted nematic display mode. In this case, the alignment direction of the alignment films 20 is set to correspond to the twist angle 240° of the liquid crystal layer. A reflective display mode such as the R-OCB mode which uses polarizing plates may also be employed as the display mode for the reflective liquid crystal display device 600 of Example 6.

In Examples 3 to 6, each pixel group is composed of one row of pixels aligned in the horizontal direction. The present invention is not restricted to this arrangement, but the same effect as that described above can also be obtained when each pixel group is composed of one column of pixels aligned in the vertical direction (i.e., pixels sharing a same source signal line). In the latter case, the polarizing layers, the regions of the phase layer and/or the regions of the alignment films are also alternately arranged every column of pixels. Alternatively, each pixel group may be composed of only one pixel, and right-eye pixels and left-eye pixels may be arranged in a checkered flag pattern. Each pixel group may also be composed of a plurality of rows of pixels or a plurality of columns of pixels. In this case, however, the resolution lowers compared with the case where each pixel group is composed of one row of pixels or one column of pixels.

In Examples 3 to 6, the polarizing layers and the phase layer were disposed inside the liquid crystal display device (in the inner surface portion of the counter substrate). Alternatively, at least the polarizing layers or the phase layer may be disposed in the outer surface portion of the counter substrate. This is also applicable to the light reflection layer. That is, though the pixel electrodes of the liquid crystal display device were used as the light reflection layer in Examples 3 to 6, the pixel electrodes may be formed as transparent electrodes and a separate light reflection film may be disposed in the outer surface portion of the liquid crystal display device.

According to the present invention, the configuration of the substrate having TFTs is not restricted to the configuration described above, i.e., the configuration including the switching elements, the lines connected to the switching elements, the interlayer insulating film formed over the switching elements and the lines, and the display electrodes formed on the interlayer insulating film. A configuration including the switching elements, the lines connected to the switching elements, and the display electrodes, omitting the interlayer insulating film, may also be used.

As the method for driving the reflective liquid crystal display device according to the present invention, not only the active matrix driving method using TFTs described in Examples 3 to 6, but also a multiplex driving method, a multi-line driving method, an active matrix driving method using MIM elements, and the like may be used.

The present invention is not restricted to the configuration of disposing the polarizing layers and the phase laser in one of the substrates as described above. For example, in the case of the reflective display mode such as the STN mode and the TN mode, two polarizing plates are used to realize the reflective display mode. In such a case, two polarizing layers may be formed on the two substrates, so that light which has passed through the two polarizing layers is reflected by a light reflection layer.

The order of the color filters, the counter electrode, the polarizing layers, and the phase layer is not restricted to that described in Examples 3 to 6, but may be changed as required.

The reflective liquid crystal display devices for color image display were described in Examples 3 to 6. The present invention is also applicable to reflective liquid crystal display devices for monochromatic display.

The reflective liquid crystal display device according to the present invention is not restricted to the direct-view display for portable information terminals and the like, but can also be used for the projection display such as projectors and OHPs. However, the reflective liquid crystal display device according to the present invention is particularly advantageous when used as a display of a portable information terminal, for example, in that the confidentiality of displayed information can be enhanced. This is because, when confidential information is displayed as three-dimensional images, such information cannot be observed by anyone other than the wearer of the pair of polarizing glasses. The displayed three-dimensional images are only observed as doubling blurred images by viewers who do not wear the pair of polarizing glasses.

Thus, according to the present invention, a light reflection layer is provided for the liquid crystal display device including the liquid crystal display elements and the polarizing layers having the polarizing function so as to utilize ambient light. A light source for illumination is therefore unnecessary. This reduces power consumption, and thus a liquid crystal display device for three-dimensional image display durable for long-time use can be obtained at low cost.

When the liquid crystal display device includes switching elements formed in one of the substrates, a high voltage ON/OFF ratio for driving the liquid crystal is obtained. This improves the contrast ratio and thus the display quality.

In the reflective liquid crystal display device according to the present invention, a plurality of regions each composed of at least one pixel and having a polarization selection function are arranged so that the direction of the polarizing axes of one region is different from that of an adjacent region. Especially, each region having the same polarizing direction extends in the horizontal direction and such regions having different polarizing directions are alternately arranged in the vertical direction. With this arrangement, the lowering of the resolution can be apparently reduced when three-dimensional images are perceived.

Moreover, in the reflective liquid crystal display device according to the present invention, the person who can perceive the three-dimensional images is restricted to the wearer of the corresponding pair of glasses. This is therefore suitable for displaying images corresponding to confidential information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a plurality of pixels including right-eye pixels and left-eye pixels;

a display screen constructed of the plurality of pixels;

a first substrate including a first display electrode;

a second substrate including a second display electrode arranged opposite the first display electrode;

a liquid crystal layer interposed between said first and second substrates;

a polarizing layer disposed in at least one of the first substrate and the second substrate; and a reflection film disposed in one of the first substrate and the second substrate, wherein the polarizing layer has first regions arranged to correspond to the right-eye pixels and second regions arranged to correspond to the left-eye pixels, the first regions selectively transmitting first polarized light and the second regions selectively transmitting second polarized light which is different from the first polarized light, and wherein the polarizing layer is disposed in the second substrate, and the first display electrode is a reflective display electrode which also serves as a reflection film.

2. A liquid crystal display device according to claim 1, wherein the first polarized light and the second polarized light are linearly polarized light of which polarizing directions are perpendicular to each other.

3. A liquid crystal display device according to claim 1, wherein the first polarized light and the second polarized light are circularly polarized light of which polarizing directions are rotated in opposite directions to each other.

4. A liquid crystal display device according to claim 3, further comprising an optical layer or a phase layer disposed to correspond to at least either of the right-eye pixels and the left-eye pixels.

5. A liquid crystal display device according to claim 1, wherein the first substrate further includes switching elements connected to the first display electrode and signal lines connected to the switching elements.

6. A liquid crystal display device according to claim 1, wherein the first substrate further includes switching elements connected to the first display electrode, signal lines connected to the switching elements, and an interlayer insulating film formed over the switching elements and the signal lines, and the first display electrode is formed on the interlayer insulating film to cover the switching elements.

7. A liquid crystal display device according to claim 1, wherein one of an electric field control birefringence mode, a guest-host mode, and a twisted nematic mode is employed as a display mode.

8. A liquid crystal display device according to claim 1, further comprising alignment films disposed in the first substrate and the second substrate, wherein the alignment films are alignment-treated so that liquid crystal molecules in regions of the liquid crystal layer corresponding to the right-eye pixels and liquid crystal molecules in regions of the liquid crystal layer corresponding to the left-eye pixels are oriented in directions perpendicular to each other.

9. A liquid crystal display device according to claim 1, wherein the first substrate includes a first insulating plate and the second substrate includes a second insulating plate, and the polarizing layer is located between the first insulating plate and the second insulating plate.

* * * * *